US006058389A

United States Patent [19]
Chandra et al.

[11] Patent Number: 6,058,389
[45] Date of Patent: May 2, 2000

[54] APPARATUS AND METHOD FOR MESSAGE QUEUING IN A DATABASE SYSTEM

[75] Inventors: Sashikanth Chandra, Belmont; Dieter Gawlick, Palo Alto; Sandeep Jain, Belmont; Hasan Rizvi; Premal Shah, both of Foster City; Alvin To, Redwood City, all of Calif.

[73] Assignee: Oracle Corporation, Redwood Shores, Calif.

[21] Appl. No.: 08/961,597

[22] Filed: Oct. 31, 1997

[51] Int. Cl.$^7$ .................................................. G06F 17/30
[52] U.S. Cl. ................................................ 707/1; 709/102
[58] Field of Search ................................. 707/10, 103, 1, 707/100; 709/100, 102, 103, 203

[56] References Cited

U.S. PATENT DOCUMENTS

| | | | |
|---|---|---|---|
| 4,965,716 | 10/1990 | Sweeney | 364/200 |
| 5,551,035 | 8/1996 | Arnold et al. | 395/650 |
| 5,706,516 | 1/1998 | Chang et al. | 395/680 |
| 5,729,540 | 3/1998 | Wegrzyn | 370/336 |
| 5,745,703 | 4/1998 | Cejtin et al. | 395/200.68 |
| 5,790,804 | 8/1998 | Osborne | 395/200.75 |
| 5,848,234 | 12/1998 | Chernick et al. | 395/200.33 |
| 5,870,761 | 2/1999 | Demers et al. | 707/201 |
| 5,873,086 | 2/1999 | Fujii et al. | 707/10 |

Primary Examiner—Paul V. Kulik
Attorney, Agent, or Firm—McDermott, Will & Emery

[57] ABSTRACT

An advanced message queuing system is integrated into a database system. A queue is an ordered list of messages. Messages are requests for processing by an application. Messages are database objects and can represent events or data. Messages comprise user data and control information such as a queue name. Each queue is part of a table in a relational database. A queue table holds a set of queues. Dictionary tables store configuration information describing queues and queue tables. Messages are entered into a queue by instructing the database system using an enqueuing command attached to a message and control information. The control information describes how to order, schedule, and execute the message, and can include a result queue name into which a result message is written after execution. The system responds to a dequeuing command by delivering a copy of a message from the queue. A user can define message order within a queue, message delay factors, and exception processing. Messages may be retained in their queues after delivery and can be preserved, queried, documented, correlated, reviewed and tracked, alone or in a set comprising a transaction, regardless of message state or execution state. The system can be used to develop large-scale, message-oriented distributed applications. Existing development tools for database applications can also be used to develop queuing applications. Administrative functions to create, delete, and specify access control for queues are provided. The system provides transactional integrity; a single transaction applies to both the database and the queue. A single transaction log is maintained.

60 Claims, 17 Drawing Sheets

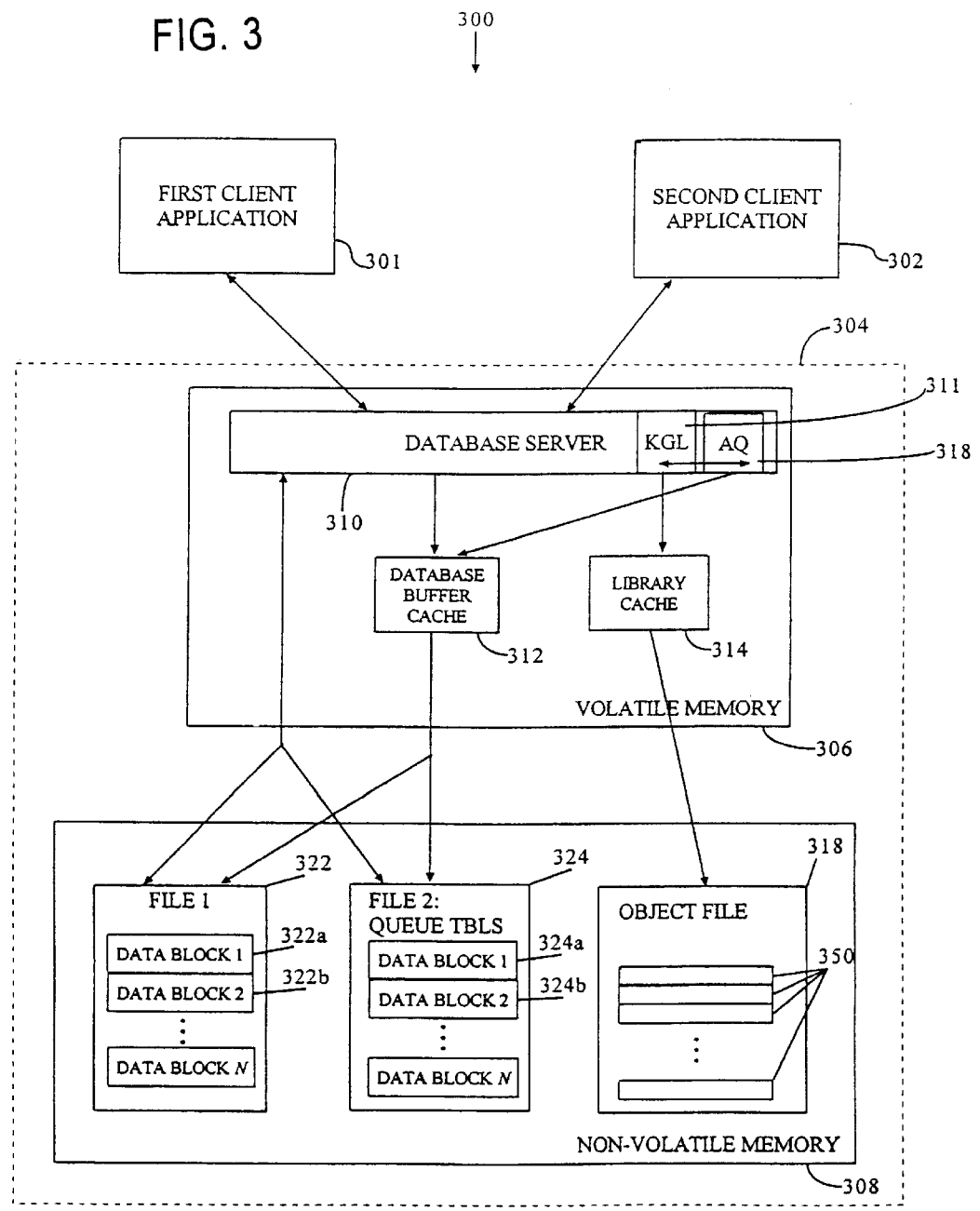

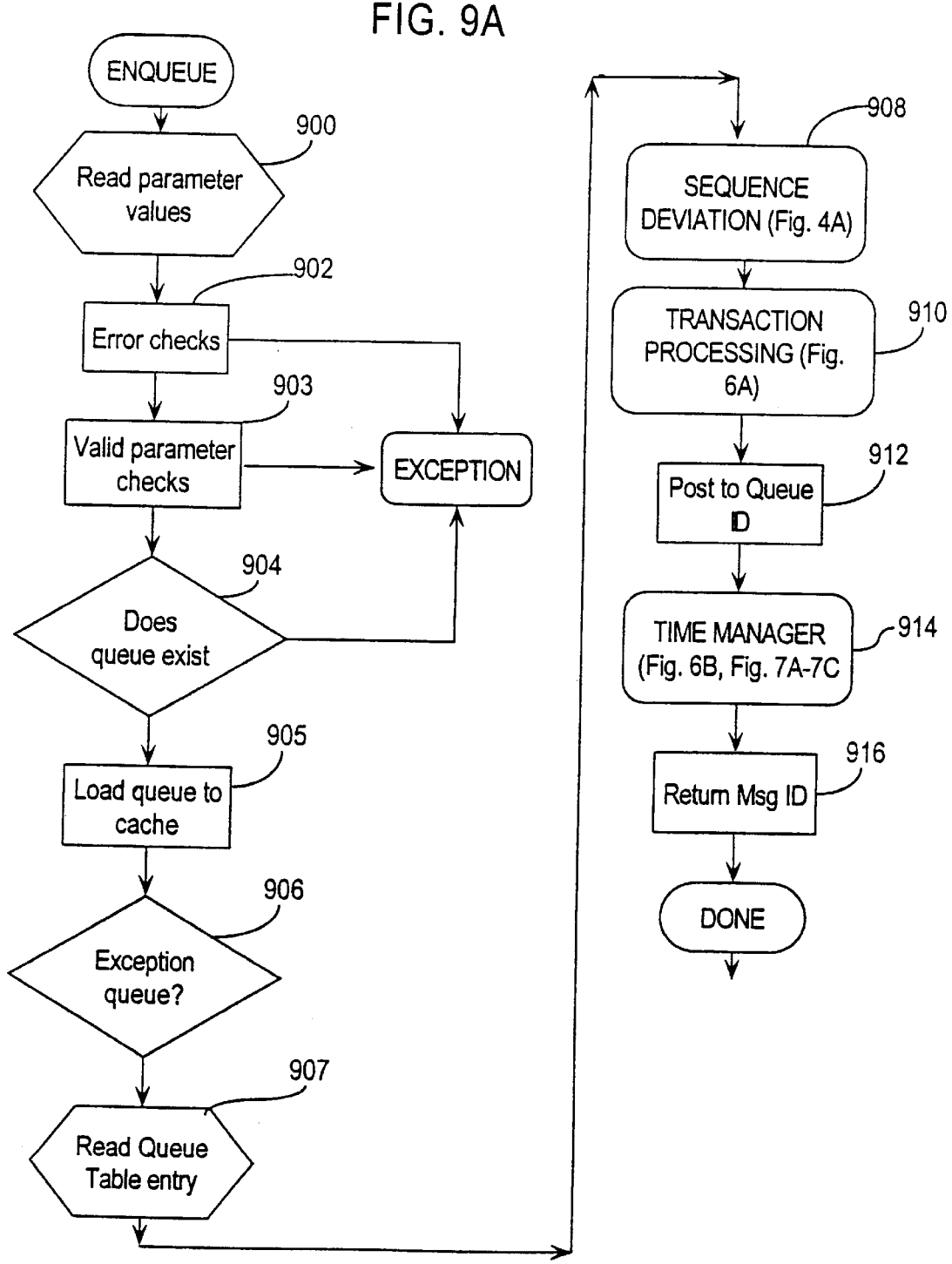

APPARATUS AND METHOD FOR MESSAGE QUEUING IN A DATABASE SYSTEM

FIELD OF THE INVENTION

This invention relates to database systems, and relates more specifically to queuing messages within a database system.

BACKGROUND OF THE INVENTION

Many computer systems are organized according to a client/server metaphor. In client/server computing, in general, end users are each provided with a desktop computer or terminal known as a "client." The clients are connected using a network to another computer known as a "server" because its general function is to serve or fulfill requests submitted by clients. Application programs running on the clients prepare requests and transmit them to the server over the network. The server immediately executes each request as it is received; this is often called "on-line" or "connected" execution of work.

However, in some environments, deferred or disconnected execution is preferred or required. For example, a particular application may require entry of data or execution of any operation at a later time after specific conditions are met. As another example, deferred execution can be applied to data processing used in product order entry and shipping by a manufacturing company. In the conventional approach, a single application program handles both order entry and order shipment. With deferred execution, an order-entry program receives orders, and then adds an entry into the queue for a shipping application. Since less work is done at order-entry time, the order-entry application runs faster. Such deferred execution is also termed "asynchronous processing." Known implementations of asynchronous processing in client/server computing environments are inefficient and not robust.

Queuing can be used to implement deferred execution of work. In a system with queuing, a request for work is entered into a queue of requests, and the system defers processing of the request until later, such as when the requesting process has completed the task, process or transaction that created the request. Queuing has been recognized as an important component of systems that mimic human business processes or work flow.

Processing each client/server request exactly once is often important to preserve the integrity or flow of a transaction. Once-only processing must occur even when a processor, system, or network fails. For example, if the request is an order for a number of shares of stock at a particular price, execution of the request zero or two times is unacceptable even if a network or system failure occurs during transmission, receipt, or execution of the request. Integrating transaction-processing technology with queuing technology to provide "persistent queuing" can fulfill the requirement of once-only processing.

Some known transaction processing monitor software ("TP monitors") includes persistent queuing functions. Persistent queuing is also supported in "message-oriented middleware" (MOM) products such as IBM's MQ Series. However, current implementations of persistent queuing suffer from notable drawbacks. For example, past persistent queuing systems lack means for manipulating or managing data contained in a message, which is the element stored in a queue. Such systems also have insufficient means for logging, recovering, and storing messages, and lack means for disaster recovery, querying or displaying executed queued messages; messages are discarded after execution.

Another disadvantage of MOM systems is lack of transactional integrity. Generally, completing a transaction requires updating both a database and a separate queue, a process known as two-phase commit. Maintaining consistency between the database and the queue requires special effort on the part of the application programmer. Also, an external transaction coordinator, such as a TP monitor, is required. This makes the environment more complex to manage.

Such systems often store queued messages in a proprietary database that is inaccessible to application programmers or end users. Management of such databases complicates system management and may require additional education of users or administrators.

Such systems often store message queues external to an application and external to a relational database system required by users of the queuing system; accordingly, distributed transactions are required for communication with queues, creating unnecessary system overhead.

In addition, prior systems do not permit multiple external processes or applications, known as message consumers, to remove a message from the message queue. This is a significant limitation because in many business processes, multiple applications need to receive the same message.

SUMMARY OF THE INVENTION

There is a need for an arrangement that provides the ability to receive, hold and disburse messages while preserving each message.

There is a need for such an arrangement that enables messages to be communicated between clients and servers over networks, or between programs running on a server.

There is a need for such an arrangement that is integrated so that messages combine both control information and content.

There is a need for an arrangement that can queue messages, and treat queued messages as events that may trigger other messages.

There is a need for such an arrangement that exhibits high scalability by continuing to exhibit high performance as use of the arrangement increases, as the number of messages increases, and as the number of stored messages increases.

There is a need for an arrangement that can control messages using message content, for example, by routing, subscribing, and querying messages based upon their content.

There is a need for an arrangement that integrates a message queue into a database system such that queued messages may be queried, read, and reported on regardless of message state or schedule for execution.

There is also a need for an arrangement providing persistent queuing in a database system in which messages between database applications are stored in a queue and forwarded or executed when defined conditions are satisfied. There is also a need for such an arrangement in which messages persist in the database system after forwarding or execution, and in which messages can be grouped into transactions and forwarded or executed as a complete transaction.

These and other needs are addressed by the present invention, where an advanced message queuing mechanism is provided in a database system. The message queuing system forms a part of the foundation or kernel of the database system such that queuing operations are accessible to any application adapted to the database, and to other processes within the database.

According to one aspect of the present invention, a queue is an ordered list of messages. Messages are requests for processing by an application and represent the smallest unit of work, which an application can carry out. Messages are database objects and can represent events or data. Messages comprise user data and control information such as a queue name. Each queue is a set of messages in a queue table in a database. A queue table holds a set of queues. Dictionary tables store configuration information describing queues and queue tables. A sort order table stores columns defining an order for each queue of messages. A timetable stores rows for each message for which a processing time delay or expiration time is defined. Processes of the invention are implemented as functions within the kernel of a database server of the database system.

According to another aspect of the present invention, messages are entered into a queue by instructing the database system using an enqueuing command attached to a message and control information. The control information describes how to order, schedule, and execute the message, and can include a result queue name into which a result message is written after execution. The database system is configured to respond to a dequeuing command by delivering a copy of a message from the queue. A user can define message order within a queue, message delay factors, and exception processing. Messages are retained in their queues after execution and can be queried, reviewed and tracked, alone or in a set comprising a transaction, regardless of message state or execution state.

The invention represents the first queuing system that is integrated with a database management system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings in which like reference numerals refer to similar elements and in which:

FIG. 3 is a block diagram of a database system configured for use with the invention;

FIGS. 4A-1 and 4A-2 are flow diagrams of a Sequence Deviation process;

FIG. 9A is a flow diagram of an Enqueue process; and

DETAILED DESCRIPTION OF THE PREFERRED EMBODIMENT

A method and apparatus for queuing messages in a database, such as a relational database management system (RDBMS) is described. In the following description, for the purposes of explanation, numerous specific details are set forth in order to provide a thorough understanding of the present invention. It will be apparent, however, to one skilled in the art that the present invention may be practiced without the specific details. In other instances, well-known structures and devices are shown in block diagram form in order to avoid unnecessarily obscuring the present invention.

Hardware Overview

Figure 1:
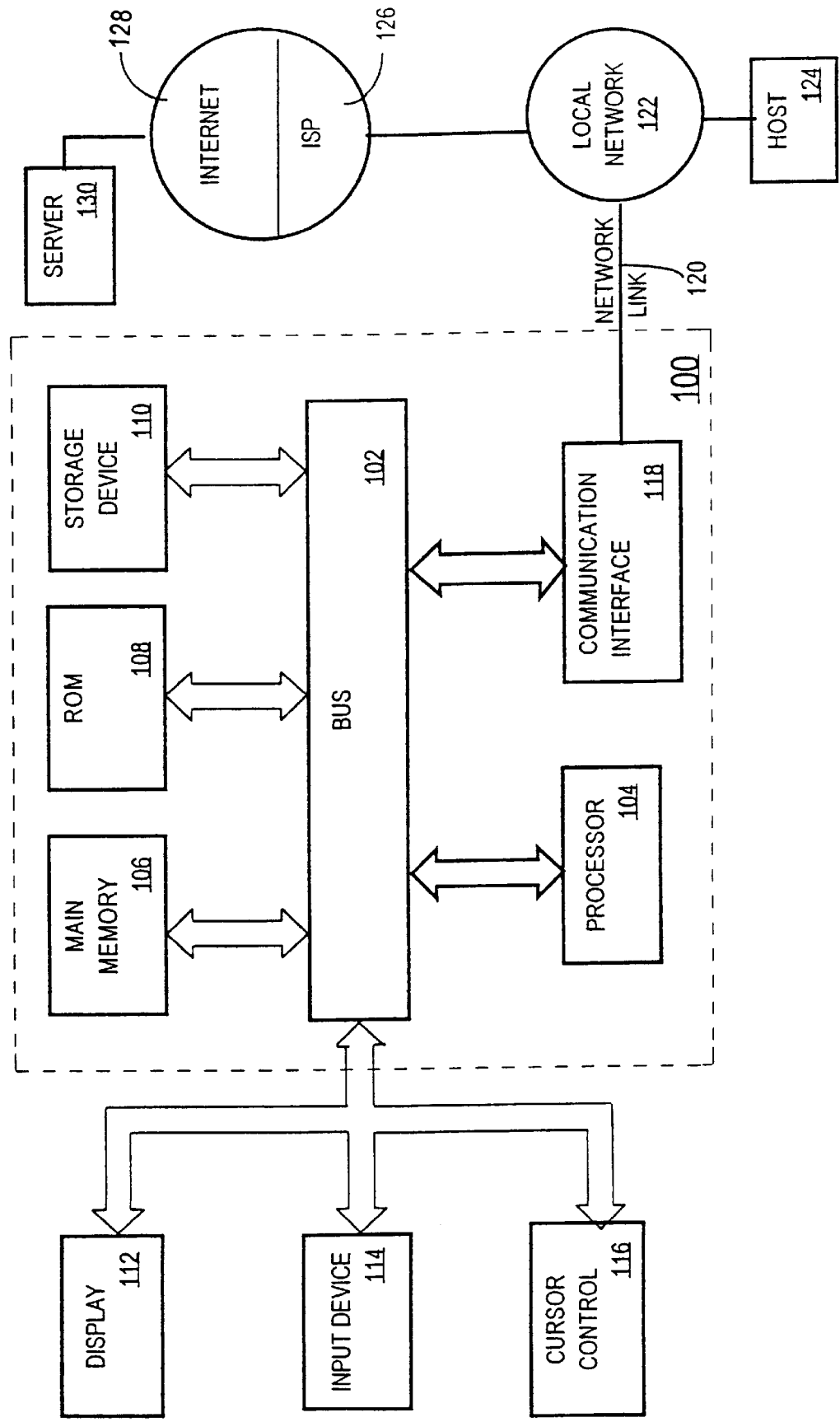
FIG. 1 is a block diagram of a hardware system that can be used to implement this invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for queuing messages in a database system. According to one embodiment of the invention, queuing messages in a database system is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for queuing messages in a database system as described herein.

The received code may be executed by processor 104 as it is received, and/or stored in storage device 110, or other non-volatile storage for later execution. In this manner, computer system 100 may obtain application code in the form of a carrier wave.

Queue System Structural Overview

Figure 2:
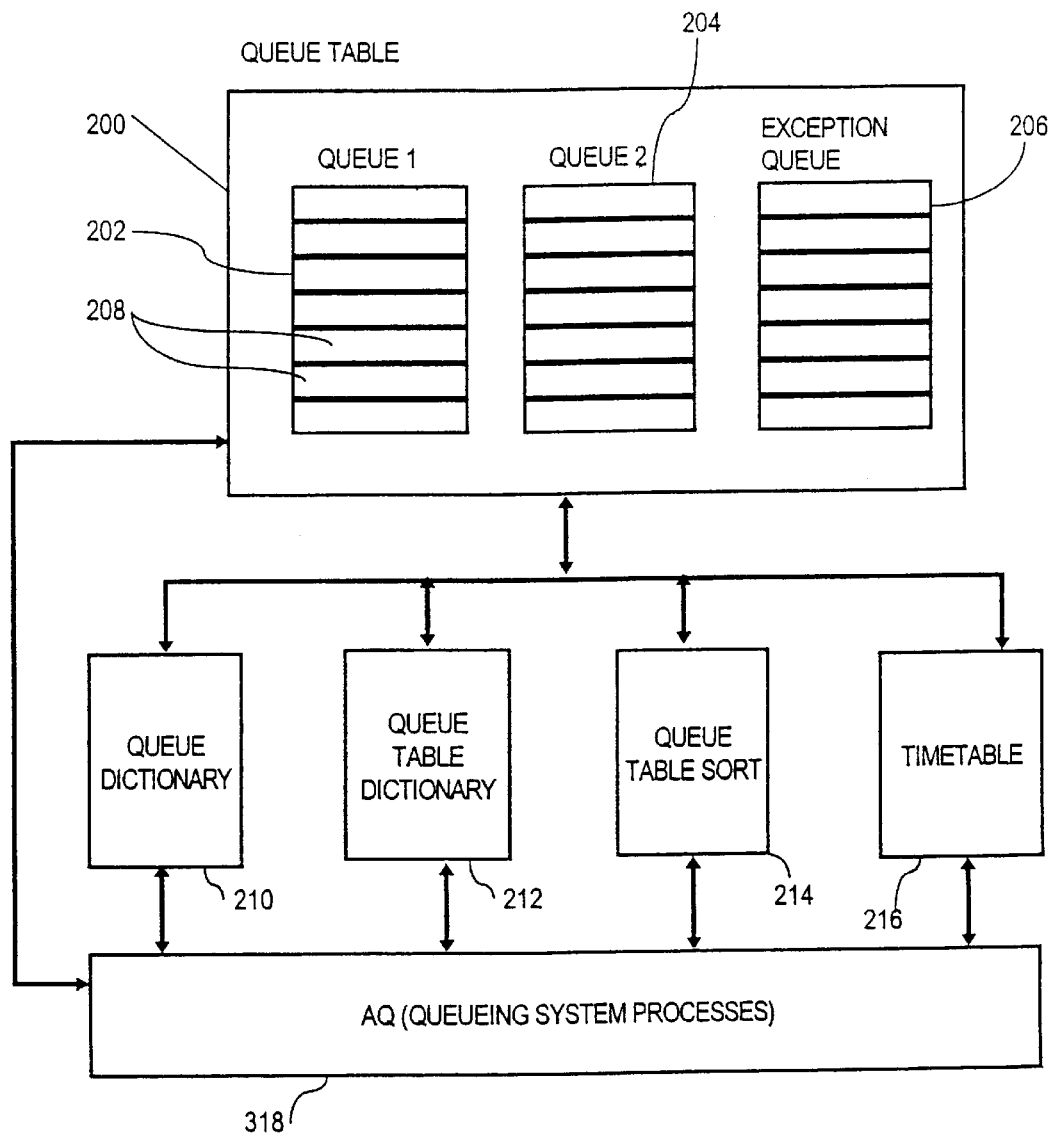
FIG. 2 is a block diagram of logical data structures used in the invention.

Queuing in a database system can be implemented in a combination of software and hardware components shown in overview fashion in FIGS. 2–3. A database application system 300 comprises first and second client application programs 301, 302 coupled to a relational database system 304. The relational database system 304 comprises a database server 310 stored in a volatile memory 306 of a processor, such as main memory 104 of computer system 100. The database server 310 communicates with data files 322, 324 either directly or through a database cache 312 interposed between a data file (such as file 324) and the database server 310. The data files are stored in a non-volatile memory 308, such as data storage device 107 of the computer system 100; each of the data files comprises a plurality of data blocks. For example, data file 322 comprises data blocks, 322a, 322b, which contain data of interest to the application programs 301, 302.

The database server comprises a kernel generic library cache manager (KGL) 311, which is an executable segment of program code configured to retrieve, execute and manipulate a library of database objects. The database objects 350 are stored in an object file 318 in the non-volatile storage device 308. The KGL 311 retrieves and executes the database objects 350 through a library cache 314 logically located between the KGL 311 and the object file 318. The KGL 311, which is known in the art, includes program functions which can create objects, modify objects, drop or delete objects, lock objects to ensure data concurrency, pin objects in a cache to ensure cache concurrency, manage dependencies among objects, and coordinate multiple shared memory caches. Since some of the tables of the queuing system store meta-data describing queue data, the library cache is also described herein as a meta-data cache.

Database files 322, 324 of the relational database system 300 also store queue tables comprising queues and messages of queues, as shown in FIG. 2. The units processed by the queuing system are messages 208. A message 208 represents the smallest unit of work processed by a single transaction, for example, a request for processing by an application. A transaction can create or process multiple messages. A message comprises user data and control information, also called payload and metadata, respectively. The user data of a message is passed form the process or application program which created the message to another application, transaction or process, based on what is in the control information, but without modification of the user data. The control information represents message properties used by the queuing system to manage messages. Transactions can create messages using an ENQUEUE operation and consume messages by using a DEQUEUE operation. Messages are selected for consumption based upon the control information stored with the message.

A queue 202, 204 represents a collection of messages 208 ordered as in a list. Each message belongs to only one queue. Queues 202, 204 can be created, altered, started, stopped and dropped using the operations and processes described herein. Each queue 202, 204 is represented by a KGL object, and is referenced by an object name (the queue name) and its owner name (the schema name) in the library cache.

A queue table 200 holds a set of queues, and each queue table 200 is implemented as a database table within the relational database system 300. Each queue table 200 can contain multiple queues 202, 204 each having multiple queue messages 208. In one embodiment, a queue table 200 is structured as shown in FIG. 2. Each row of the queue table 200 represents a message 208 in a queue 202, 204. Some of the columns in a queue table 200 are meta-data describing a queue 202, 204. In one embodiment, each row of the queue table 200 has the following columns:

| Column | Contents |
| --- | --- |
| QUEUE | Queue name |
| MSG_ID | Message identifier |
| CORR_ID | User-provided correlation identifier |
| MSG_PRIORITY | Message priority |
| MSG_STATE | State of the message (READY to be processed, DELAYED, PROCESSED, or EXPIRED) |
| DELAY | Time after which the message will be ready to be processed |
| EXPIRATION | Message expiration time in seconds |
| TIME_MANAGER_INFO | Date used by time manager process to monitor messages |
| LOCAL_ORDER_NO | Local order number of message |
| CHAIN_NO | Chain number of message |
| DSCN | Dependent transaction number |
| CSCN | Commit transaction number |
| ENQ_TIME | Original enqueue time |
| ENQ_USER_ID | User identifier for the user who enqueued the message |
| ENQ_TXN_ID | Current transaction identifier |
| DEQ_TIME | Time when the message was dequeued |
| DEQ_TXN_ID | Transaction which performed the dequeue |
| DEQ_USER_ID | User id of the user who dequeued the message |
| RETRY_COUNT | Number of retries |
| REPLY_QUEUE_OWNER | Reply queue schema |
| REPLY_QUEUE | Reply queue name |
| EXCEPTION_QUEUE_OWNER | Exception queue schema |
| EXCEPTION_QUEUE | Exception queue name |
| ARG_COUNT | Number of arguments |
| USER_DATA | User data for use by an application or process |

Configuration information for queue tables and queues are stored in two dictionary tables. A Queue Table Dictionary Table 212 stores configuration information for queue tables and a Queue Dictionary Table 210 stores configuration information for all queues defined in the system. In one embodiment, each row of the Queue Table Dictionary Table 212 has configuration information for one queue table 200, and the Queue Table Dictionary Table 212 has the following columns:

| Column | Contents |
| --- | --- |
| OWNER | Queue table schema |
| QUEUETABLE | Queue table name |
| TYPE | Type of user data stored in queues in the queue table (OBJECT TYPE for user-defined object types or VARIANT for internal use) |
| OBJECT_TYPE | Abstract data type of user data stored in queues of the queue table (provided only when TYPE has the value OBJECT TYPE) |
| OBJECT_NUMBER | Number of queue table object |
| TABLE_COMMENT | User comment about the queue table |

In this embodiment, each row of the Queue Dictionary Table 210 represents a queue defined in a queue table of the queuing system, and the Queue Dictionary Table 210 has the following columns:

| Column | Contents |
| --- | --- |
| OWNER | Queue schema name |
| NAME | Queue name |
| QUEUETABLE | Queue table containing the queue named NAME |
| QID | Identifier for the queue |
| QTYPE | Queue type (NORM for normal queue, EXPT for exception queue) |
| MAX_RETRIES | Number of times a message is processed before being moved to an exception queue |
| RETRY_INTERVAL | Time lapse before retry takes place |
| ENQUEUE | Boolean flag identifying whether ENQUEUE is disabled/enabled |
| DEQUEUE | Boolean flag identifying whether DEQUEUE is disabled/enabled |
| TRACKING | Boolean flag identifying whether queue tracking is disabled or enabled |
| RETENTION | The duration for which dequeued messages will be retained in the queue (TRANSIENT if messages retained for the duration specified in DURATION; PERMANENT if message retained permanently) |
| DURATION | Number of days for which the message is retained |
| QUEUE_COMMENT | User comment about the queue |

To enable users to specify a default sorting order for each queue table when a queue table is created, the queuing system also includes a Queue Table Sort table 214. Each row in the Queue Table Sort table 214 represents a sort order for a queue table. The table has the following columns:

| Column | Contents |
| --- | --- |
| OBJ_NO | Object number |
| SORT_POS | Position of this column; position defines where to order |
| SORT_COLUMN | Position of the column used in the sort expression of DEQUEUE |
| SORT_ORDER | Column order (allowed values are 1 for Ascending, 2 for Descending) |
| COLUMN_NAME | Column name for DEQUEUE sort order |

In one embodiment, there is also a Time Manager table or Timetable 216. The Timetable 216 has a row for each message 208 that is subject to a delay time or expiration time. Each row contains columns that store the message identifier, queue name, queue schema, time in seconds, and a flag indicating whether the time is a delay time or expiration time. Each of the tables 200, 210, 212, 214 and 216 are stored non-volatile storage or in main memory of the computer system 100 and are logically coupled to the database server 310.

An agent is a queue user. Two types of agents interact with the queuing system: producers that place messages in a queue, and consumers that retrieve or dequeue messages. Any number of agents may access a queue at a given time. Such agents are considered outside the structure of the queuing system, and therefore are not described in detail in this document. However, they interact with the queuing system and are discussed as the context requires. Preferably, agents are internally represented in the queuing system using an abstract data type Agent having attributes that store the agent's name, address, and protocol.

Processes of the queuing system are carried out by computer program segments configured to execute the operations described herein. The processes and operations described above can be implemented in computer programs using any suitable programming language, such as a language that is generally usable for developing application programs for a relational database system. The processes are embodied in executable computer program segments that form a part of a database server of a relational database system, so that the processes are called from within an application program developed for that relational database system. For example, the processes can be compiled into an Advanced Queuing (AQ) system 318 of a kernel portion of the database server of the RDBMS. In this embodiment, the processes are accessible through calls to kernel functions that implement the processes, and through a public application program interface (API) so that an application program can access the processes using API calls. The API can be the Oracle Call Interface (OCI), and can be implemented in the Structured Query Language (SQL) or in PL/SQL. Application programs include calls to OCI functions, using OCI handles, or API calls that carry out message enqueuing, dequeuing, and queue management. Application programs also can call queue system functions using executive or EXEC statements embedded within the program. For example, an application program written in the C language can access queue functions by using the EXEC compiler directive to embed SQL statements and queue system function calls in the program. Other processes are implemented as background processes.

In one embodiment, the processes are implemented in the same programming source language used for other elements of the database server. For example, the queuing system is provided with a C language interface as a part of the kernel of the database server, comprising a set of C language functions implementing the processes of the invention. Each of the C functions corresponds to one of the processes of the system, e.g., ENQUEUE or DROP_QTABLE. Each C function accepts one C data structure ("struct") as a parameter. Each C function converts values passed to it in the C structure into values understandable by the processes of the queuing system.

In this embodiment, an SQL interpreter is coupled to the C functions. In this way, the processes can be called either as C functions or by directing SQL statements to the SQL interpreter, which translates the SQL statements into an appropriate C function call. Thus, the SQL interpreter forms an API in which each API call has the name of the process given above.

General Features

The following general aspects characterize an embodiment of the invention.

SQL ACCESS. Messages are placed in rows of a database table. Messages can be queried using standard SQL statements. Thus, an application program can use SQL to access message properties, message history, and message content. Existing SQL technology, such as indexes, can be used to optimize access to messages.

Integrated Database Level Operation Support

All standard database features such as recovery and restart are supported. The queuing system can be administered through existing database management tools. Because queues are implemented in database tables, the operational benefits of high availability, scalability and reliability apply to queue data. Also, database application development and management tools can be used with queues; for example, queues can be imported and exported.

Structured Payload

An application program can specify message content using abstract data types (ADTs) based upon the rich typing system of an existing database system. When the invention is implemented with an object-relational database management system, such as Oracle8, the application program may use relational data types as well as user-defined types. As a result of messages having strongly typed content, powerful features are enabled. For example, the queuing system can be used to provide content-based message routing whereby an external agent or application program examines content of a message and routes the message to another queue based upon its content.

Retention and Message History

An application program can specify that messages shall be retained in a queue after consumption or dequeuing by the program or another program. The duration of retention can be specified. The system stores information about the history of each message, including the time of enqueuing and dequeuing, and the identity of the transaction that carried out enqueuing or dequeuing. The history information can be used for tracking, data warehouse, and data mining operations.

Tracking and Event Journals

Retained messages can be related to one another. As a result, sequences of related messages can be tracked and used as event journals.

Integrated Transactions

The integration of control information with content (data payload) in a message simplifies application development and management.

Ordering

Each message in a queue is ordered within the queue. The order of a message is defined at the time a queue table is created, and is used for sorting messages when a DEQUEUE operation is executed. In response to a DEQUEUE request, the system retrieves the first message according to the sort order, skipping messages that are to be processed by other transactions. The system can execute steps to control the order of messages in a queue. The system is configured to associate columns in a queue table with a message of a queue so that the columns are used to order messages. By default, messages are ordered in ascending or first in, first out (FIFO) order. The order of a message also can be specified using a priority code, or by a sequence deviation parameter as described below.

The system is also configured to execute steps such that message processing is delayed, for example, so that a DEQUEUE request for a message will fail until a specified time delay has passed. However, the time delay will be ignored if the system receives a message identifier or a correlation identifier for the message at the time a DEQUEUE operation is requested. Thus, if a user of the system knows the specific identity of a message and requests it, the system will not force the user to wait until the time delay has passed.

Sequence Deviation

The system is configured to change the dequeuing order of a specific message if the message contains control information indicating that the message should be processed before a reference message. The system is configured to accept urgent message enqueue requests; urgent messages are automatically placed at the top of a queue.

Time Constraints

The system is configured to carry out steps that cause a specific message to be processed only within a particular time interval or "time window."

Correlation Identifiers

The system is configured to carry out steps that cause a specific message to be tagged with a label called a "correlation identifier." Correlation identifiers facilitate human use of the system by enabling messages to be retrieved by a mnemonic alphanumeric name.

Reply Queue

The system is configured to carry out steps that cause a message received from an application program, such as applications 301, 302, to be tagged with a reply queue identifier. The application program can provide the name of a reply queue or output queue at the time that the application requests to ENQUEUE a message. When the message is processed, the processing application or transaction can direct an output message to the named reply queue.

Exception Queue

The system includes an exception queue 206 in each queue table 200. If a message cannot be executed according to control information associated with the message (e.g., within a given time window), if execution of a message results in failure, or if an external application server or an application program 301, 302 is unable to process a message, the message is moved to the exception queue 206. A user can specify a different exception queue. The system can be configured to attempt to pass a message to an external application server several times before enqueuing the message in the exception queue. The exception queue enables rapid detection of failed message execution because such failed messages are directed to, and can be reviewed in, a single location.

Non-transactional Requests

Normally ENQUEUE and DEQUEUE requests are made in the context of a larger transaction containing other requests and statements in the Structured Query Language (SQL). The system enables a message to be treated as an independent transaction. An application can specify that a specific request is a transaction itself, thereby making its result immediately available to other transactions. For example, messages can be made visible to other applications either immediately after an enqueue or dequeue operation is completed, or only after the transaction is committed.

Browsing

The system is configured normally to delete a message after the DEQUEUE operation results in successful processing of the message. However, the system is also configured to receive a BROWSE option that is set in control information provided to the system with the DEQUEUE request. When a message is "browsed," it remains available in the queue for further processing. When a message is removed, it is not available for subsequent dequeue requests.

Security

When a message is enqueued in a queue, the system assigns the message the same security context as the process or application issuing the ENQUEUE request. If the security context changes as multiple messages in a transaction are processed, then the system sends a message to a security system of the relational database system requesting the current security context to be re-set to the context of the original message. In this way, an application server can inherit the security context of the first message in a transaction, which is the same context as the process, which created the transaction.

Multiple Consumers Per Message

A message can be dequeued by more than one application. Each queue acts as a message repository, and each application has a different view of the same queue. Accordingly, a message can be dequeued and deleted from an application's view, while the same message remains in the queue view of another application.

Subscription & Recipient Lists

An application programmer or administrator can specify a list of subscribers that can retrieve messages from a queue. In this context, the term "subscribers" means application programs or processes that use messages from a queue. Different queues can have different subscribers, and a consumer program can be a subscriber to more than one queue. Further, specific messages in a queue can be directed to specific recipients who may or may not be subscribers to the queue, thereby overriding the subscriber list.

Message Grouping

Messages belonging to one queue can be grouped to form a set that can only be consumed by one subscriber at a time. All messages belonging to a group are created in the same transaction and all messages created in one transaction belong to the same group. Accordingly, complex messages can be segmented into several simple messages.

Navigation Messages in Dequeuing

A consuming application or process can select the first message in a queue, or select a particular message and thereafter select the next message. Selection can be specified through ordering, and can be limited using a correlation identifier. Specific messages can be retrieved using a message identifier.

Waiting for Messages

A dequeue request can be issued against an empty queue. An application can specify whether, and for how long, the request should wait for a message to arrive.

Retry with Delay

Generally a message can be consumed or dequeued exactly once. If an attempt to dequeue a message fails, the message will be made available for reprocessing after a user-specified delay. Reprocessing will be attempted multiple times, and the maximum number of retries can be specified by the application or user.

Queue System Operation

Operation and structure of the system and its components to carry out the foregoing processes is described in the following section.

Enqueue Operation

The system adds a message to a queue by receiving and executing an ENQUEUE operation request or process. The process comprises computer program segments configured to carry out the steps described below. An ENQUEUE request can be an SQL statement having the name ENQUEUE and accepting the parameters shown in Table 1:

TABLE 1

ENQUEUE Parameters

Queue Name
Enqueue Options
Message Properties
User Data (Payload)
Message Identifier All parameters are optional except Queue Name and User Data.

The Enqueue Options parameter is a data structure that stores the following values: Visibility; Relative Message Identifier; and Sequence Deviation Code. The Message Properties parameter is a data structure that stores the following values: Priority Code; Delay; Expiration Time; Correlation Identifier; Attempts; Recipient List; Exception Queue; Enqueue Time; and State. In one embodiment, values reflecting message priority, delay, expiration, correlation, attempts at execution, recipient list, exception queue, enqueue time, and message state are grouped together and stored as a message properties object. The parameters have the following definitions and effects on the system and its components:

Queue Name: The Queue Name value identifies the name of the queue to which the message should be enqueued. The value may not be an exception queue because the system is configured to prohibit users from enqueuing messages to the exception queue; only the system may do so.

Correlation Identifier: The correlation identifier is a value that identifies a message to a user of the system. The correlation identifier can be any convenient data type, preferably a data type that is known to and usable by an application program 301, 302 in communication with the system.

Figure 6A:
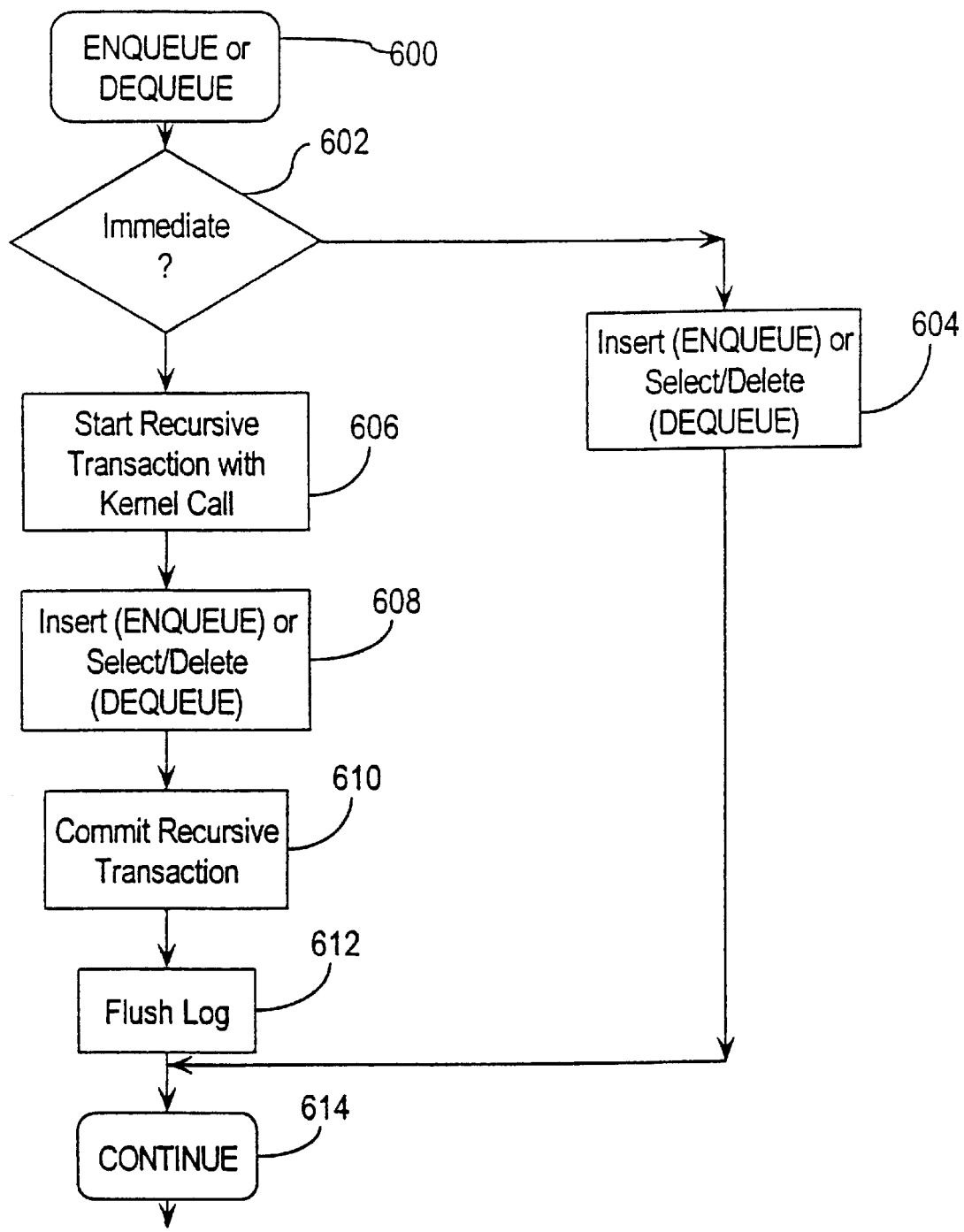
FIG. 6A is a flow diagram of a Transaction process.

Visibility: the Visibility parameter specifies the transactional behavior of the message to be enqueued If Visibility is set to ON_COMMIT, then the message is part of a current transaction along with other messages (the "standard option"), and changes to the queue are not made until the calling application program indicates that the transaction should commit. By default, the Visibility parameter is ON_COMMIT. If the Visibility parameter is IMMEDIATE, then the enqueued message is not part of the current transaction but rather is part of a recursive transaction (the "immediate option"). Processes for beginning and committing recursive transactions are provided by the database server 310. A process for evaluating the Visibility parameter during an ENQUEUE operation is shown in FIG. 6A. Step 600 indicates that Visibility parameter value processing is part of the ENQUEUE and DEQUEUE processes. In step 602, the process tests whether the Immediate option is selected, i.e., whether the Visibility parameter is set to IMMEDIATE. If the parameter is ON_COMMIT, then in step 604 the process carries out a table insert operation (for ENQUEUE processes), or select and delete operations (for DEQUEUE processes). Thus, in this step the process either inserts a row into the queue table (to enqueue a message) or selects rows from the table (to dequeue). If Destructive dequeue has been selected (as discussed further herein), a delete operation is also done to remove the message row from the queue table.

If the Visibility parameter is IMMEDIATE, then Immediate mode is selected and in step 606 the process starts a new recursive transaction by calling a kernel function in database server 310. In step 608 the process then carries out an insert, select or delete in the same manner as described above for step 604. In step 610 the process calls another kernel function of database server to commit the recursive transaction. In step 612 the process flushes the log file to make the changed data persistent. Thus, steps 610 and 612 cause the changes to the queue table made in step 608 to become permanent. In step 614 processing continues with other ENQUEUE or DEQUEUE steps.

Priority: Message priority is specified using the Priority parameter. Message priority is reviewed when messages are dequeued if the priority is specified as one of the column orderings when a queue table is created. The value of the Priority parameter may be any integer, including a negative integer; a smaller number indicates a higher priority. The default value is one.

Delay: the value of the Delay parameter represents the earliest time when the message should be scheduled for processing. If the value is NO_DELAY, then the enqueuing process is requesting immediate processing of the message. If the value is a number, then the system will not provide the message in response to a subsequent DEQUEUE operation until the Delay value in seconds has passed. However, if the DEQUEUE operation provides a correlation identifier or message identifier for the message, then the system will provide the message even if the Delay time is not complete. When a message is enqueued with a Delay value set, the State of the message is set to WAITING. When the Delay time expires, the State of the message is set to READY.

Expiration: the value of the Expiration parameter specifies the latest time at which the message can be processed, expressed in seconds with reference to the Delay value. If a message is not processed before the Expiration number of seconds have passed, the message is removed from the current queue and copied into an exception queue. Also, its State property is changed from READY to EXPIRED. A user using the Exception Queue parameter specifies the exception queue. If no exception queue is specified, or if an exception queue is specified but it does not exist when needed, the message is copied to a default exception queue 206 of the current queue table 200. If the value of Expiration is NEVER, then the message will never expire.

Sequence Deviation: The value of the Sequence Deviation parameter specifies whether the current message should be enqueued with a higher priority than the other messages already in the queue. Acceptable values are BEFORE, TOP, or NULL. Sequence deviation is described further below.

Relative Message Identifier: The value of this parameter is the message identifier of the message that should be before the currently enqueued message. This parameter is ignored if the Sequence Deviation is not specified. The parameter is required if the Sequence Deviation parameter has a value of BEFORE.

Exception Queue: The value of this parameter is the name of an exception queue to which the user of the system desires to have exception messages directed. Errors and exceptions are not defined by the database queuing system. Each application program 301, 302 defines error and exception conditions that result in queuing of messages in an exception queue.

User Data: the value of the User Data parameter is any data which a user or application wishes to transmit to another application or process. The data type of the parameter must match the data type of the value of the Queue parameter.

Message Identifier: If the user does not supply a message identifier, then the system internally generates a unique message identifier and includes it in the request. Thus, the message identifier persists for subsequent operations.

Attempts: The Attempts parameter represents the number of attempts that have been made to dequeue the message. The value of the Attempts parameter is set by the queuing system and cannot be specified by the enqueuing application.

Recipient List: The Recipient List parameter is a set of values of type Agent. Thus, the Recipient List identifies applications or processes to which messages are to be forwarded when dequeued.

Enqueue Time: The Enqueue Time parameter specifies the time that the message was enqueued. This value is determined and set by the system and cannot be set by an application program.

State: The State parameter specifies the state of the message at the time of a dequeue operation. Its value cannot be set at enqueue time. Valid values are WAITING, READY, PROCESSED, and EXPIRED. When the State value is WAITING, a message Delay value has not yet been reached. When the State value is READY, the message is ready to be processed. When the State value is PROCESSED, the message has been processed but has been retained in the queue. When the State value is EXPIRED, the message has been processed and has been moved to the Exception Queue.

The Priority, Expiration, and Delay values, among others, represent conditions that must be satisfied before a message in a queue can be executed by an application program.

FIG. 9A is a flow diagram showing an overview of certain steps carried out by the ENQUEUE process in operation. When the ENQUEUE process is invoked, e.g., through an internal C function call or through an SQL statement in an RDBMS application program, as shown in step 900, the process reads all the values of each parameter described above and passed with an ENQUEUE request, and stores them in a local memory area for rapid access. In step 902 the process carries out a series of error checks on the values. For example, the process checks whether a Priority value is in the correct range; if not, an exception is raised. In step 904 the process carries out a series of validity checks on other parameter values. For example, an exception is raised in the Expiration value is less than zero. Also, if an Expiration interval is specified, it must be greater than or equal to the Delay value. The Sequence Deviation value must be valid. If a Relative Message Identifier is specified, the process tests whether the referenced message exists. If not, an exception is raised.

In step 904, the process tests whether a queue identified by the Queue Schema and Queue Name values exists. If the queue exists, it is loaded to the library cache in step 905 using the cache load process described elsewhere herein. In step 906, the process tests whether the queue is an exception queue; if so, an exception is raised because enqueue operations are not permitted on exception queues. Otherwise in step 907 the Queue Table row corresponding to the named queue is read.

Figures 1, 4A:
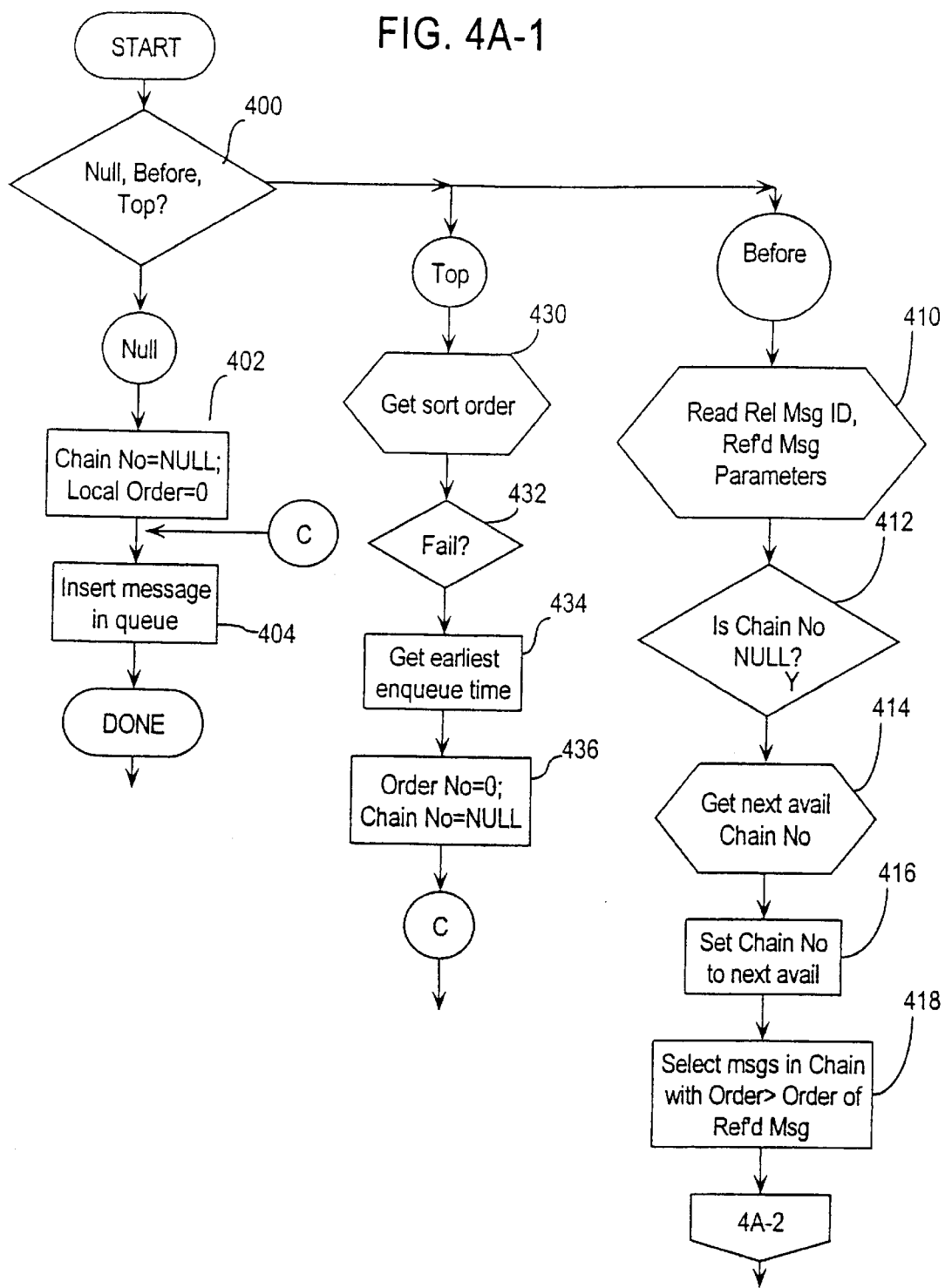
Figures 2, 4A:
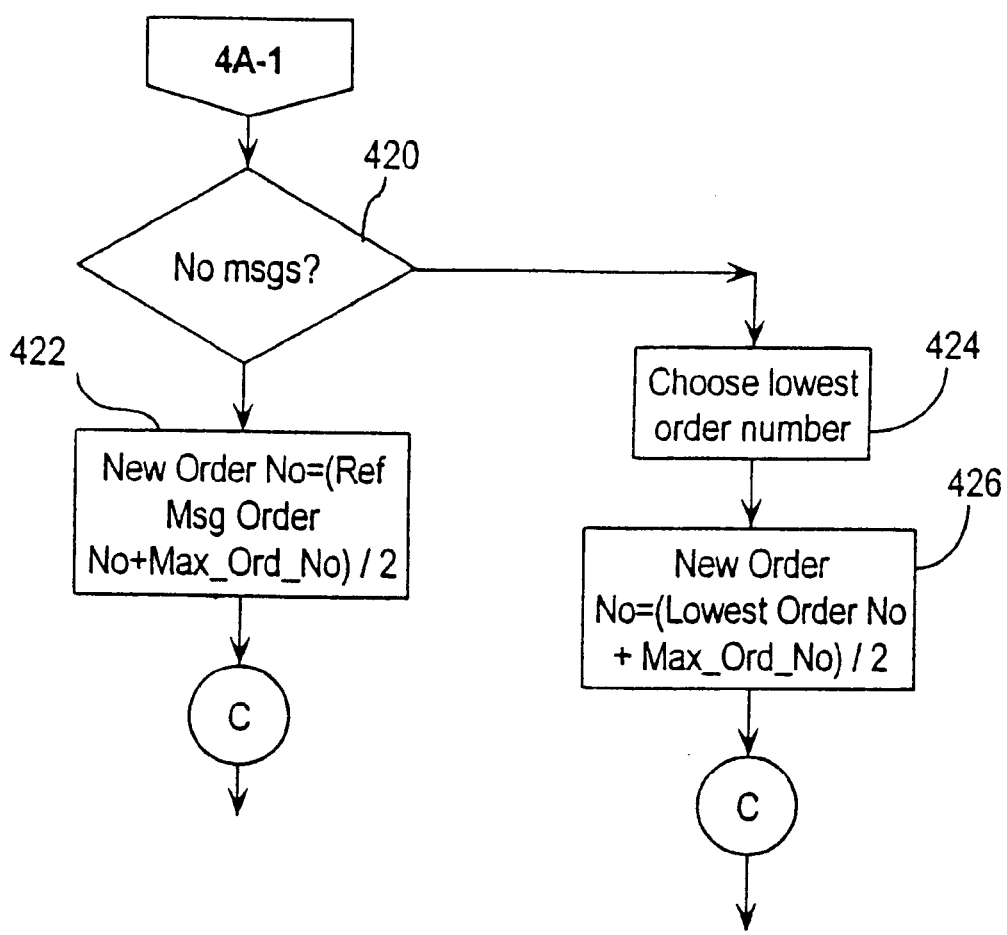

In step 908, if the Sequence Deviation parameter has a value, then sequence deviation processing is carried out according to the steps described herein in connection with FIG. 4A. In step 910 the process carries out transaction-related processing according to the steps described herein in connection with FIG. 6A. As described elsewhere herein, the transaction-related steps include the step of inserting a row representing the message to be enqueued into the queue table. In step 912, the process notifies other processes that a message has been enqueued, for example, by posting a system message to the queue identifier of the named queue. If a DEQUEUE process is waiting for a message in the named queue, as described below, such posting will awaken the DEQUEUE process and trigger dequeue processing.

Figure 6B:
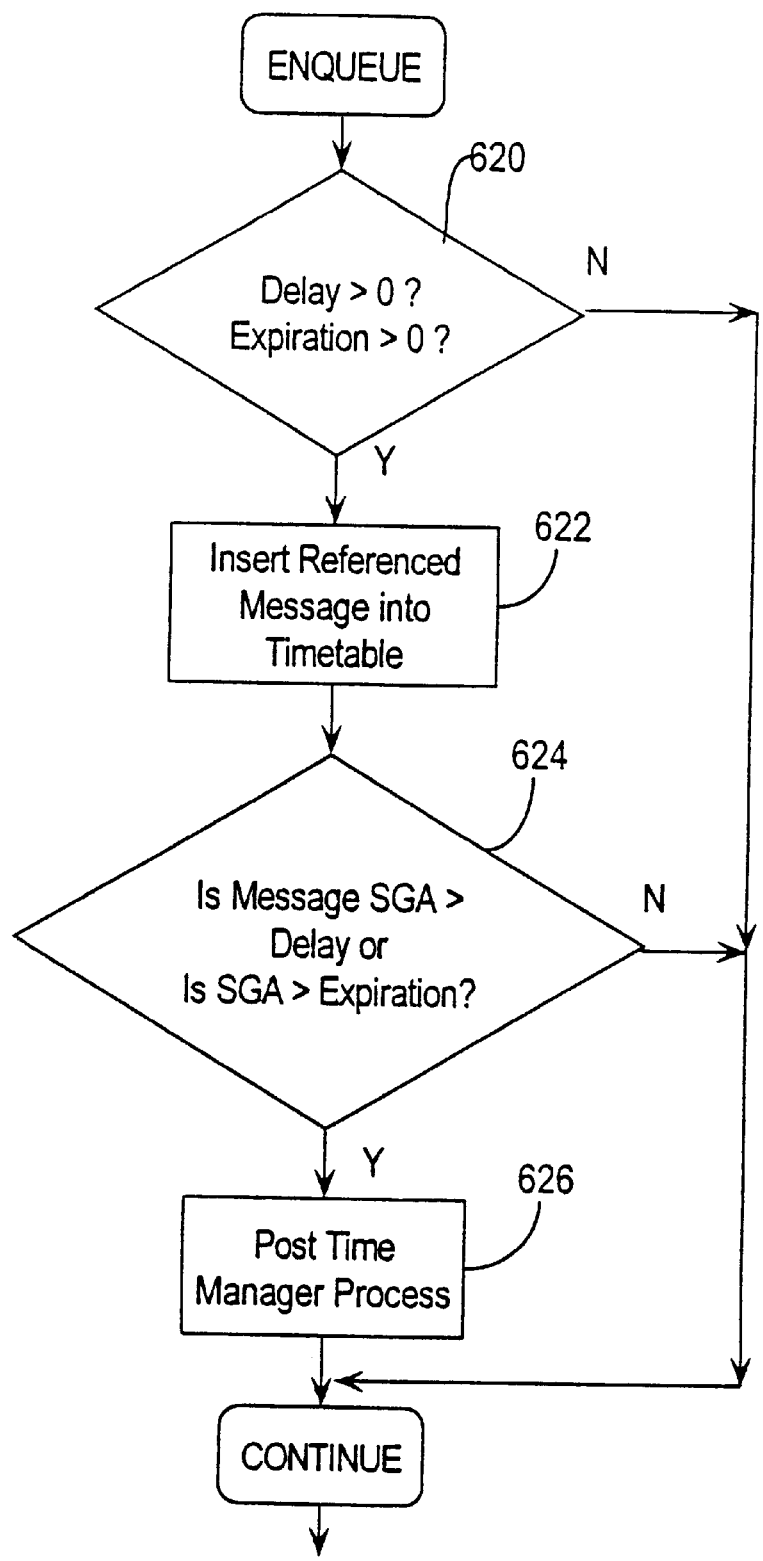
FIG. 6B is a flow diagram of Delay and Expiration processing.
Figure 7A:
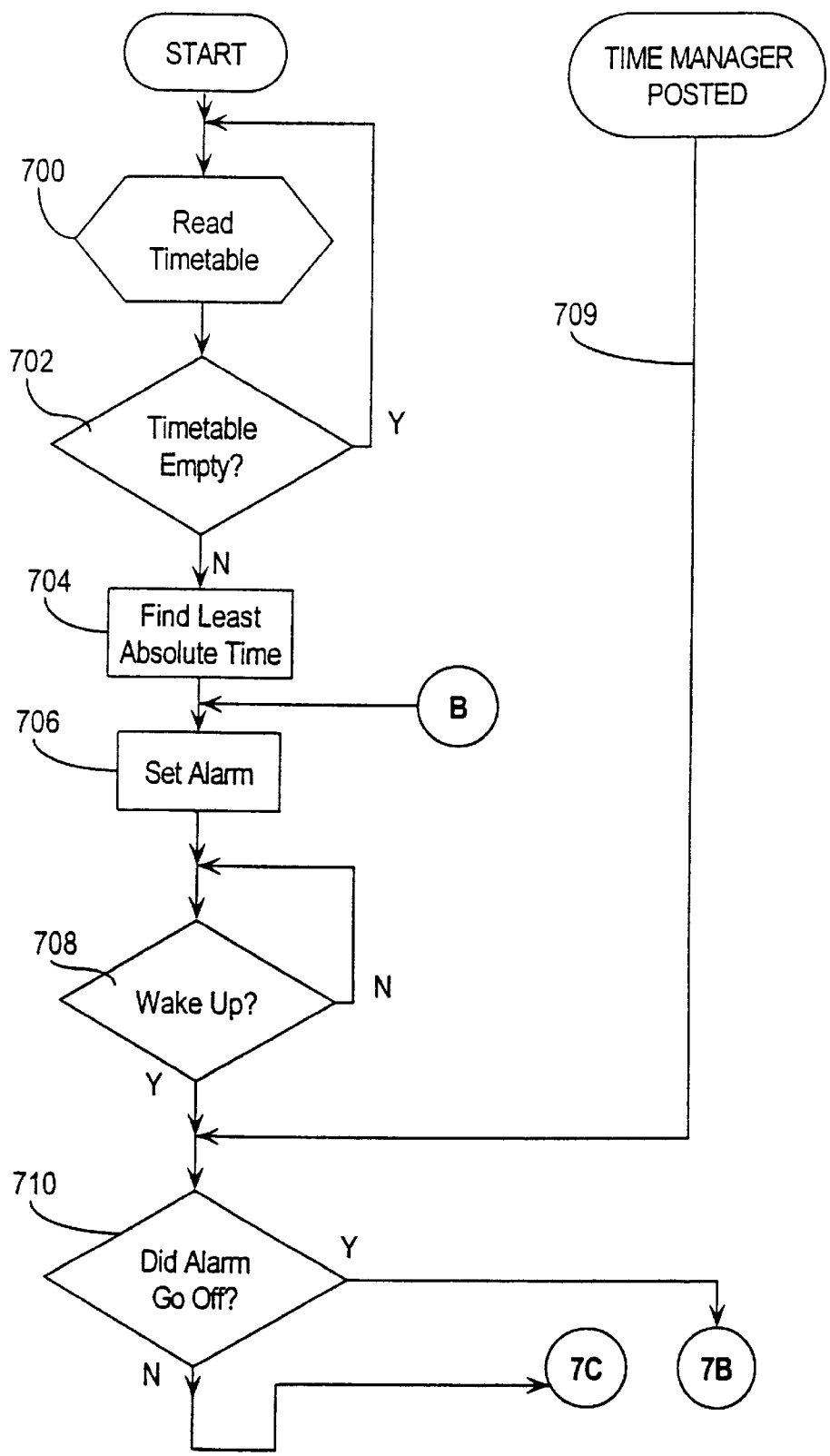
FIGS. 7A to 7C are flow diagrams of a Time Manager process.
Figure 7B:
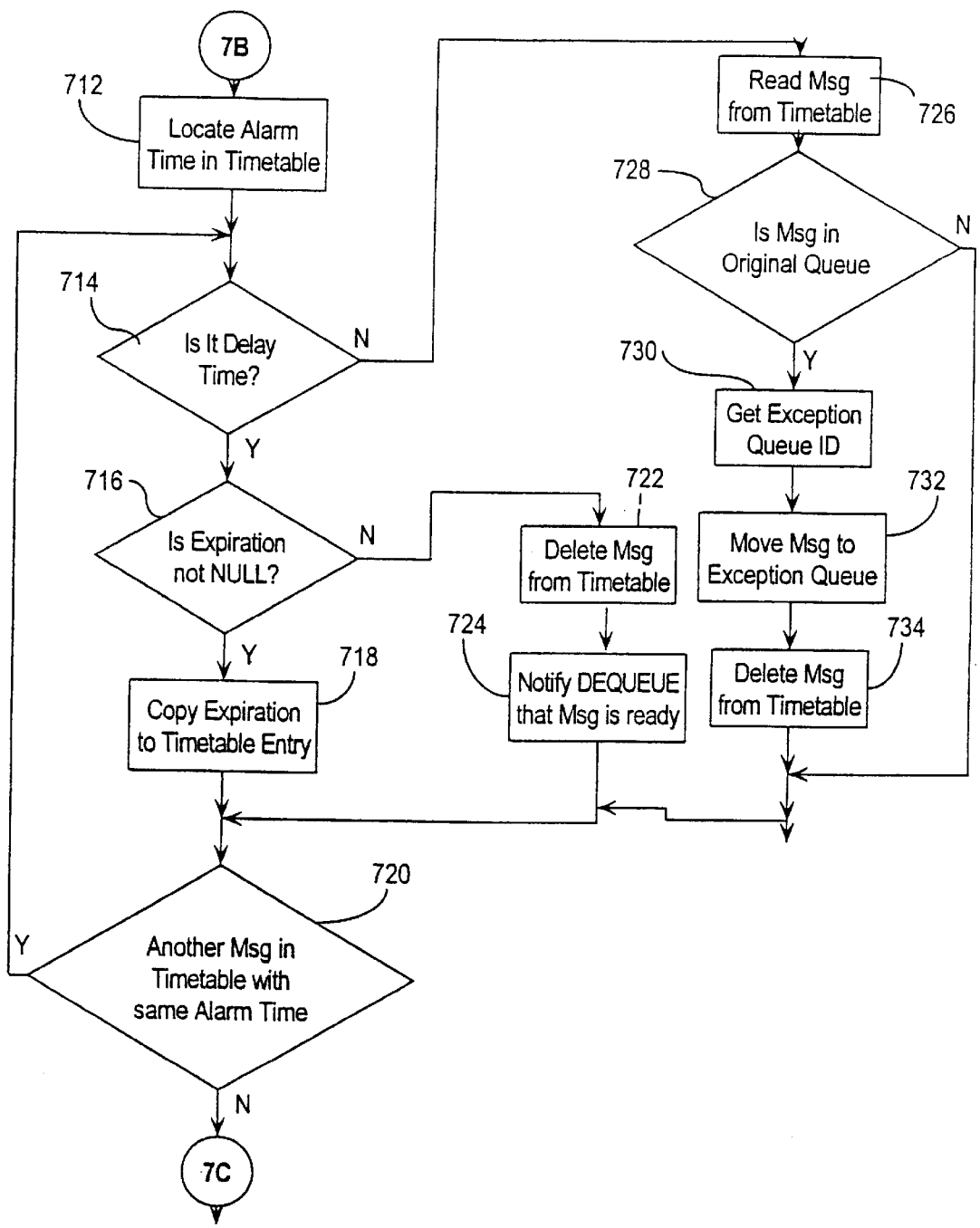
Figure 7C:
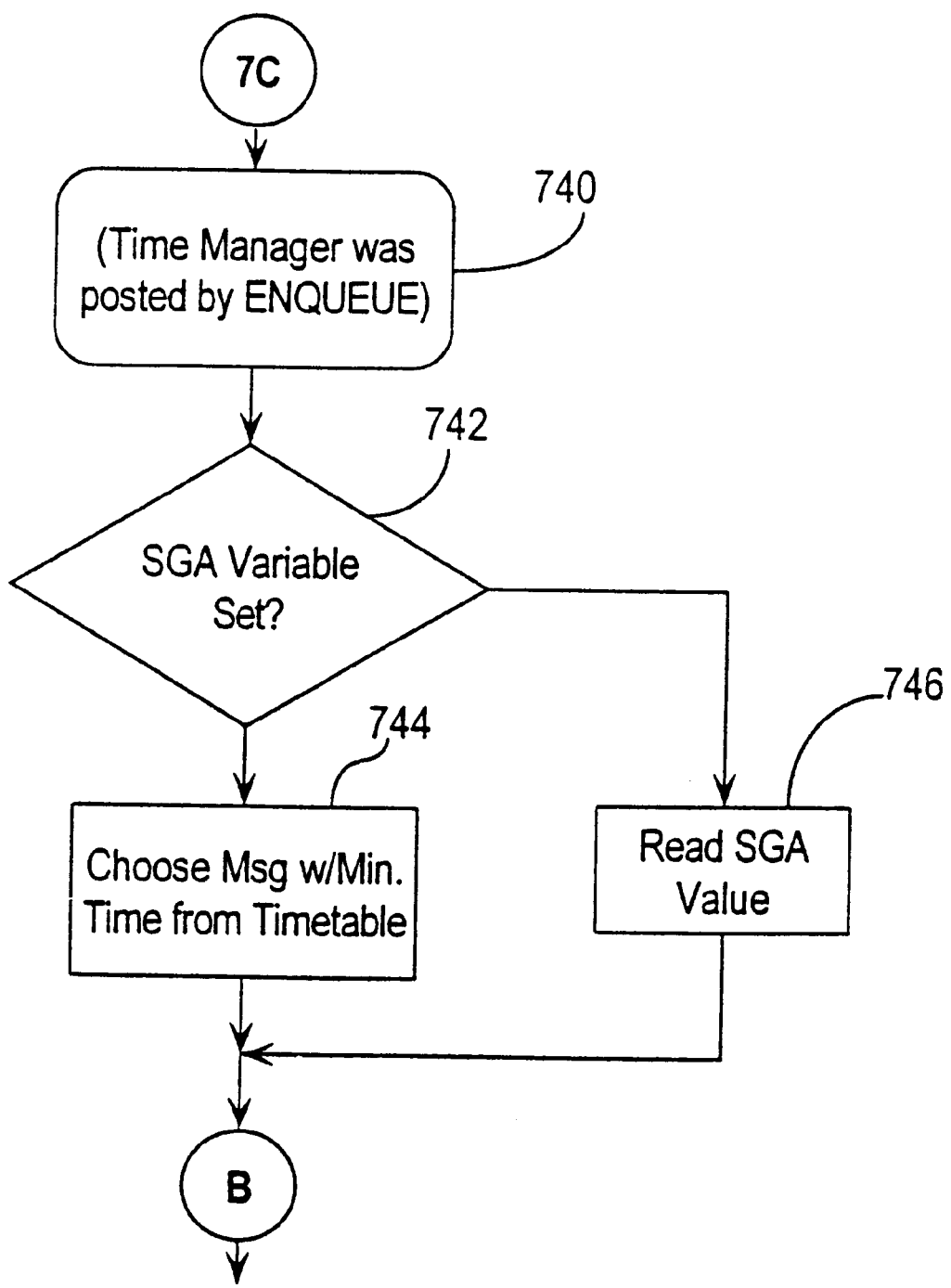

In step 914 the process evaluates the Delay and Expiration values in the manner discussed herein under the heading "Time Manager Process" and in connection with FIGS. 6B, 7A and 7C. In step 916 the process returns a message identifier of the message just enqueued to the calling process, application program, or machine.

Dequeue Operation

The system retrieves a message from a queue by receiving and executing a DEQUEUE operation request or process. A DEQUEUE request can be an SQL statement or C function having the name DEQUEUE and including the parameters shown in Table 2:

TABLE 2

DEQUEUE Parameters

Queue Name
Message Identifier
User Data
Dequeue_Options
Message_Properties

The Dequeue_Options parameter is a data structure comprising the following attributes: Consumer_Name; Dequeue_Mode; Navigation; Visibility; Wait; Message Identifier; and Correlation. The Message_Properties parameter is a data structure comprising the same attributes identified above in the discussion of the ENQUEUE operation.

Parameters for the DEQUEUE operation that have the same name as parameters defined above for ENQUEUE operate in the same way for the DEQUEUE operation as for the ENQUEUE operation, except as described herein.

The order in which messages are dequeued can be specified in several ways. As described above, if the Message Identifier or Correlation Identifier of a message 208 is known to an application program 301, 302 and is provided in a DEQUEUE request, all other orderings are overridden and the system will provide the identified message. A default dequeue order can be established for each queue table when a queue table is created as described herein in connection with the Table Sort table. If no default dequeue order is so established, and a message identifier or correlation identifier are not provided in a DEQUEUE request, then the system uses FIFO ordering to select the next message to dequeue.

Only messages that are ready to be processed will be provided by the system in response to a DEQUEUE request. For example, messages having a delay time later than the current time are not provided in response to a DEQUEUE request.

Following is a description of parameters used in the DEQUEUE operation and how they affect operation of DEQUEUE processing.

In the Dequeue-Options parameter, the Consumer_Name attribute stores a value identifying a process or application program that is consuming the dequeued message. When Consumer_Name has a value, only those messages matching the consumer name are accessed during the DEQUEUE operation. In this way, a queue can provide messages to multiple consuming programs or processes. Consumer_Name is set to NULL when a queue is not used for multiple consumers.

The Navigation attribute specifies the position in the queue of the message that will be retrieved. The DEQUEUE operation locates the position, applies a search criteria to messages at that position, and retrieves selected messages that match the search criteria. Valid values are NEXT_MESSAGE, NEXT_TRANS-ACTION, and FIRST_MESSAGE. When Navigation is set to NEXT MESSAGE, which is the default value, the DEQUEUE operation will retrieve the next message that is available and that matches the search criteria. If the previous message belongs to a message group, the DEQUEUE operation will retrieve the next available message that matches the search criteria and belongs to the message group.

When Navigation is set to NEXT_TRANSACTION, the DEQUEUE operation skips any messages in the current transaction group, and retrieves the first message of the next transaction group. Message grouping must be enabled for the queue. When Navigation is set to FIRST_MESSAGE, the DEQUEUE operation retrieves the first message that is available and that matches the search criteria. The dequeue position is reset to the beginning of the queue.

The Visibility, Wait, Message_Identifier, and Correlation attributes of the Dequeue_Options parameter affect DEQUEUE operation, with respect to the message to be dequeued, in the same manner as discussed above in connection with the ENQUEUE operation.

Queue Name: Identifies the name of the queue from which the message should be dequeued. Unless a Message Identifier or Correlation Identifier value is provided, only elements that are ready to be processed (i.e., whose time delay has passed) are dequeued.

The Message Identifier of the DEQUEUE operation is a system-generated value that uniquely identifies the message that is dequeued. If only a Message Identifier is specified, the system retrieves the first available message with the specified Message Identifier. If a Correlation Identifier is also specified, only the message with both the specified Message Identifier and Correlation Identifier will be retrieved.

Correlation Identifier: Specifies the user-supplied identification for the message to be dequeued. See "Message Identifier," above.

Dequeue Mode: DEQUEUE requests are processed by the system in one of three different modes: REMOVE mode (Dequeue Mode value of REMOVE, which is the default value); Non-destructive or "browse" mode (Dequeue Mode value of BROWSE); and Non-destructive With Locking mode (Dequeue Mode value of LOCKED). In Destructive dequeuing, which is the default mode, the system deletes a retrieved message from the queue after retrieval. In Non-destructive dequeuing, the system reads a retrieved message from the queue without deleting it. In Non-destructive With Locking, the system locks the retrieved message in the queue so that no other application or process can retrieve it, and returns a copy of the message to the calling application or process.

Wait Time: The value of the Wait Time parameter is a number of seconds that the system is to wait for a message to become available for a dequeue operation. If the value is NULL, the system will wait indefinitely. If the system receives a DEQUEUE request with a Wait Time value that is not NULL and nonzero, but no message in the queue is ready for processing, the system will wait for a time period equal to the Wait Time value for a message to become available. If Wait Time is specified as zero, then DEQUEUE will fail if no message is immediately available.

Wait processing is assisted by use of the QID queue identifier numbers provided in the queue table. When the DEQUEUE process is waiting for a message to become available, it continually checks the queue table for messages having the QID corresponding to the Queue Name. In this way, searching is accelerated.

Priority, Delay, Expiration: After dequeuing a message, the system places the priority, delay, and expiration values of the message in these fields.

Retry: The Retry parameter holds the number of dequeue operations attempted before the message is processed successfully. The system loads the Retry parameter with a value only if a dequeue operation fails due to a system crash, operation abort by a user, or other fails.

Exception Queue: This parameter identifies the name of a an exception queue to which the message is to be directed by the requesting application program if the message cannot be processed successfully.

Figure 9B:
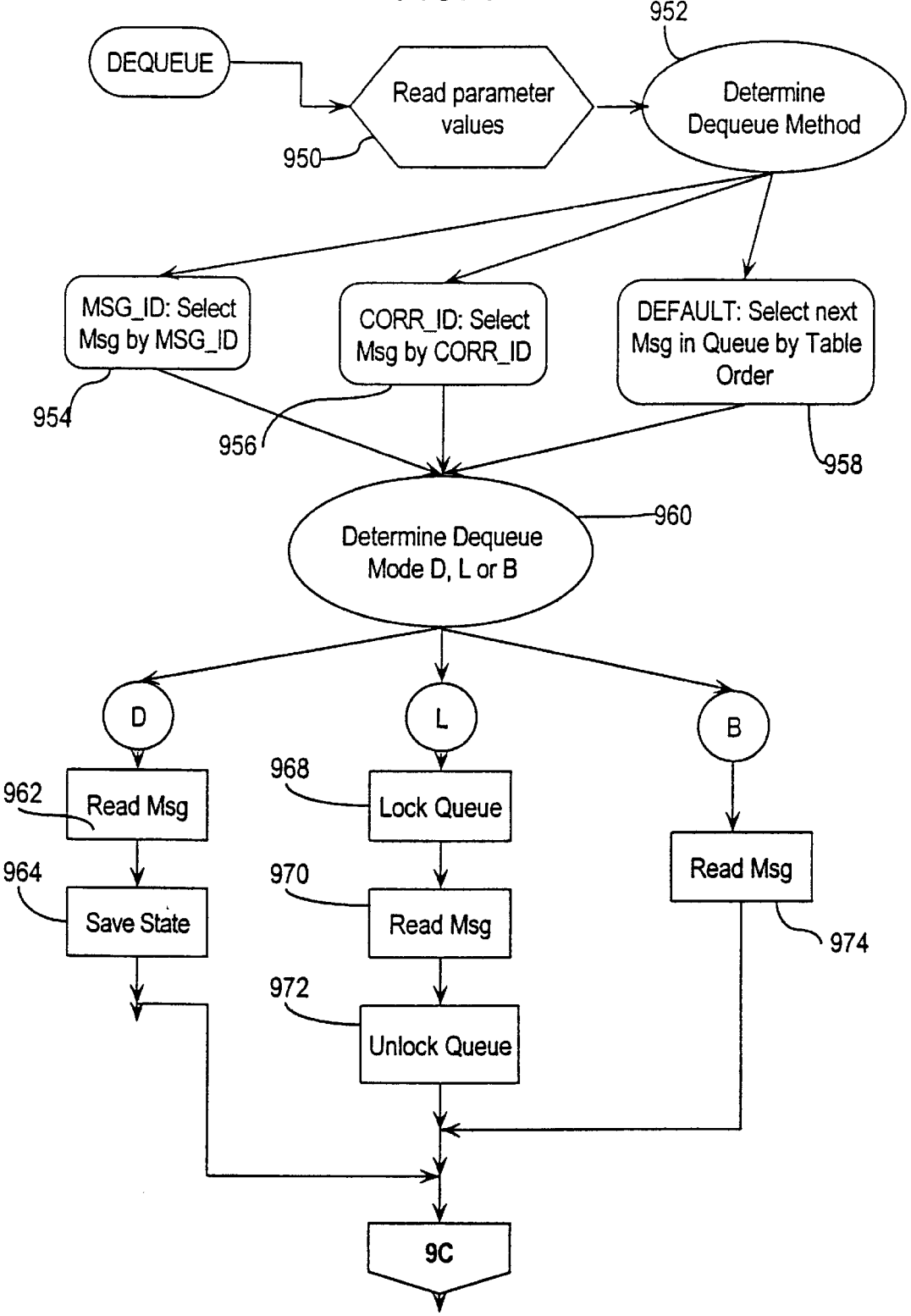
FIG. 9B to 9C are flow diagrams of a Dequeue process.
Figure 9C:
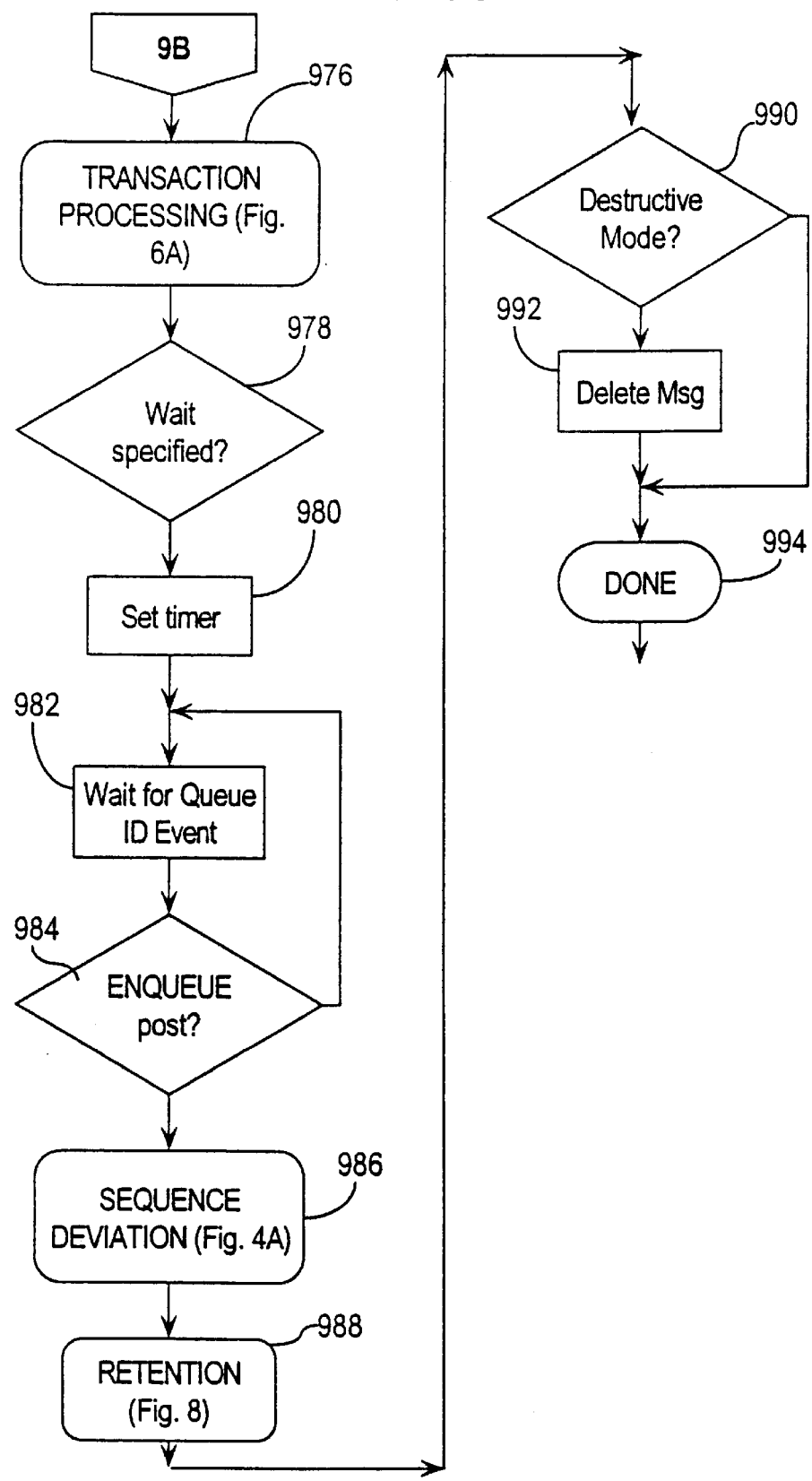

In operation, the dequeue process generally follows the steps shown in FIGS. 9B to 9C. Generally, the search criteria for messages to be dequeued is determined by the Consumer_Name, Message Identifier and Correlation attributes of the Dequeue_Options parameter. Only messages in the READY state are dequeued, unless a specific Message Identifier is passed to the DEQUEUE operation. The dequeue order is determined by the values specified at the time the queue table is created; they can be overridden by providing values for the Message Identifier and the Correlation attributes of the Dequeue_Options parameter.

In step 950, the process reads all the parameter values. In step 952, the process evaluates whether the Message Identifier value or the Correlation Identifier value is provided. If a valid Message Identifier exists, then in step 954 the process selects a message from the named queue based upon the Message Identifier. If a valid Correlation Identifier exists, then in step 956 the process selects a message from the named queue based upon the Correlation Identifier. Selection is done with SQL SELECT statements. If neither value is supplied, then in step 958 by default the process selects the next message from the queue according to the order specified in the Queue Table Order table.

The process next evaluates the Dequeue Mode value in steps 960 and 966. If its value is D, then the process reads the queue message data in step 962 and then saves the current state in step 964. This enables the process to delete the message later by returning to the same state. If the mode value is L, the process locks the queue table in step 968, reads the message in step 970, and unlocks the table in step 972. If the mode value is B, the process reads the message in step 974.

Thereafter, in step 976 the process carries out transaction sensing and transaction-based updating according to steps substantially similar to those shown in FIG. 6A for the ENQUEUE operation.

In step 978, the process tests whether the Wait value is specified. If so, then in step 980 the process sets an internal timer variable to the Wait value, and in step 982 commences waiting for an event to occur having the current Queue Identifier. In step 984 the process tests whether the ENQUEUE operation has posted a system message to the current Queue Identifier, which indicates that a newly enqueued message is ready for processing. If not, the process continues to wait.

If there is no Wait value, or if an ENQUEUE post arrives, then in step 986 the process carries out sequence deviation processing according to steps substantially similar to those shown in FIG. 4A in connection with the ENQUEUE operation. One of ordinary skill in this art will recognize that identical steps may not be used because the steps of FIG. 4A involve, in part, insertion of messages in a queue. However, substantially similar steps can be used to locate the next message to dequeue.

Figure 8:
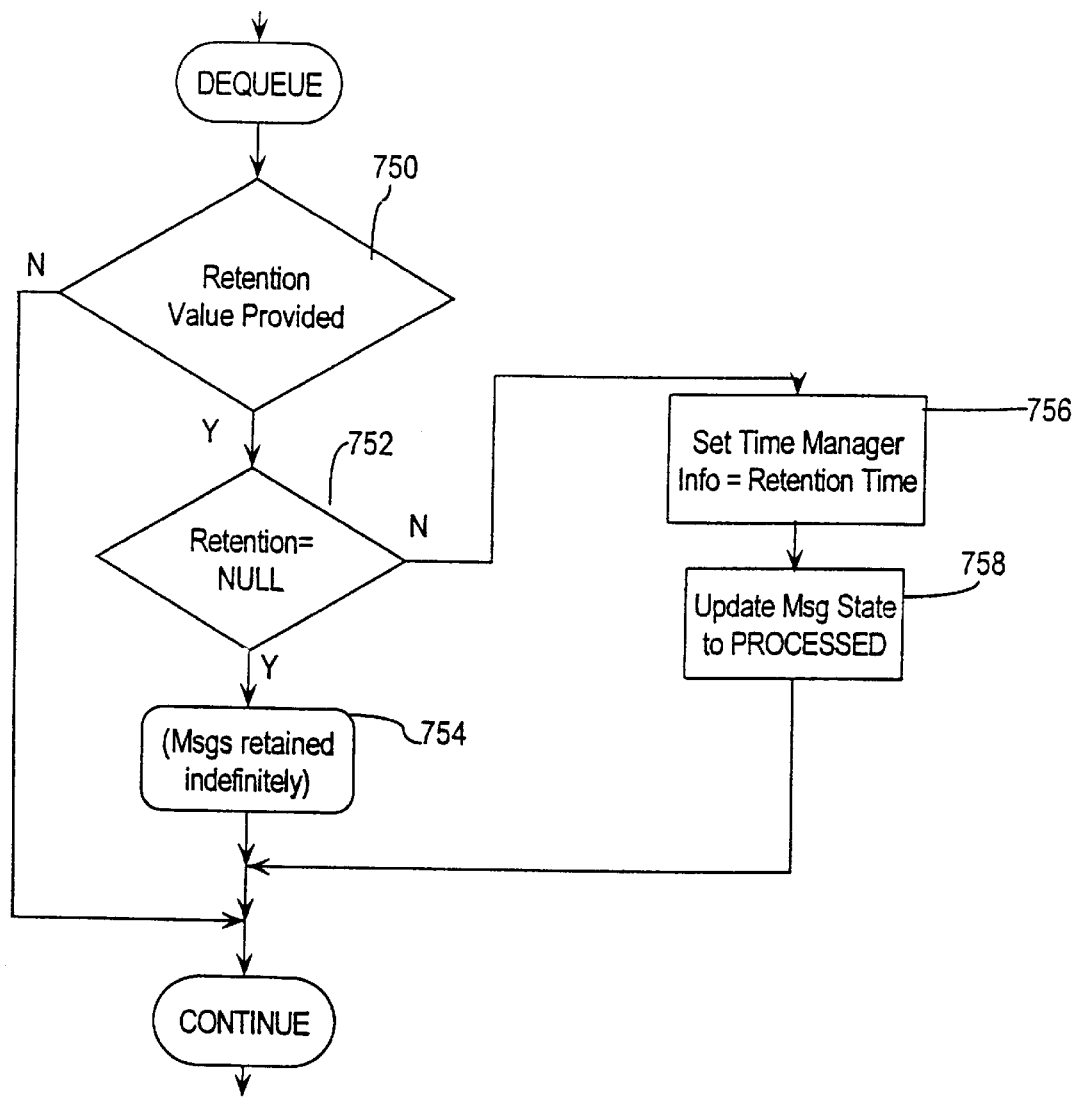
FIG. 8 is a flow diagram of a Retention process.

The process next carries out Retention processing in the manner shown in FIG. 8. After a message is dequeued, as shown in FIG. 8, the process reads the Queue Dictionary Table for the current queue and tests in step 750 whether a value in the Retention column has been specified. If the value or column is undefined, then no further processing is done. Otherwise in step 752 the process tests whether the column holds a NULL value. If it is null, then as shown in step 754 messages of that queue are to be retained indefinitely, and no further processing is done. If the value is non-NULL, then in step 756 the process sets the Time Manager Info column of the current queue in the Queue Table to the value of the Retention Time column of the Queue Dictionary Table. In step 758, the process then updates the state of the current message to PROCESSED.

In this way, even after a message is dequeued, the message is retained to maintain a history of what has been done, when, and by what process. The Time Manager, upon awakening and finding a message of status PROCESSED in the queue, will delete the message as described in connection with FIG. 7A–7B. However, the Time Manager will not find a PROCESSED message in the queue or the Timetable until its retention time is up. The Time Manager identifies processed messages that exist beyond their retention time by analyzing the time_manager_info and msg_state fields of the messages. The Time Manager will remove these messages from the queue. If Destructive mode is specified in the Dequeue Mode value, as tested in step 990, then in step 992 the process deletes the dequeued message from the current queue. Dequeue processing is then complete as shown by step 994.

Structure and Operation for Multiple Message Consumers

To provide a mechanism that enables multiple consumer processes to dequeue messages, an index structure is provided. In one embodiment, the index structure comprises an index keyed to the Queue_Name and Sort_Order columns of the Queue Table. An application that needs to dequeue a message provides a value for the Queue_Name, and a value for the Sort_Order parameter is obtained from the index. The application name <appname> is also provided as a parameter to the dequeue operation. The application name is encoded into a bit pattern that is stored in a column of the Queue Table called <consumers>. The dequeue operation effectively carries out the following operations, which are expressed in the Structured Query Language (SQL):

```
select   *
from     queue_table
where    state = READY and name =<queue_name> and bit(consumers,
         appname)
order    by <sort_order>
for      update skip locked;
```

In an alternate embodiment, the application name is omitted from the Queue Table as described above, the index structure is a table called Queue_Table_Index that is keyed to the Queue_Name and Sort_Order columns of the Queue Table. The index table also has an <appname> column, and a Queue_Table_Rowid column that maps one or more rows of the index table to one row in the Queue Table. Using this structure, a dequeue operation is accomplished using the following two queries:

```
select   queue_table_index_rowid, queue_table_rowid
from     queue_table_index, queue_table
where    name = <queue_name> and appname = <appname>
         and state = READY
order    by <sort_order>
         update skip locked;
select   *
from     queue_table
where    rowid = <queue_table_rowid>
```

Thus, the first query yields a rowid for the next ready message in the queue table for the specified queue that has not been previously dequeued by the specified application. The second query retrieves records matching that rowid from the queue table.

With this preferred structure, a message enqueue operation is carried out using the following two SQL INSERT statements. The <appname>s of messages in a queue are stored in a catalog table called aq$_queues.

```
insert
into     queue_table
values   (queue_name, msgid, . . ., user_data);
insert
into     queue_table_index
select   aq$q.appname, queue_name, sort_order, queue_table_rowid
from     aq$_queue aq$q
where    where aq$q.queue_name = queue_name;
```

In this embodiment, it is preferable for the Queue Table to maintain a reference count of the applications that have a pointer to a particular message from the index, that is, applications for which a message is within the current view. When a message is dequeued by an application, the corresponding index entry is deleted from the queue table index and the reference count of the message in the queue table is decremented. When the reference count reaches zero, the message is either deleted or archived.

This process can be implemented using the following SQL statements:

```
delete   from queue_table_index
where    rowid = <queue_table_index_rowid>
update   queue_table
set      reference_count = reference_count − 1
where    rowid = <queue_table_rowid>
if (reference_count = 0)
         delete from queue_table
         where rowid = −<queue table_rowid>
```

Figure 6C:
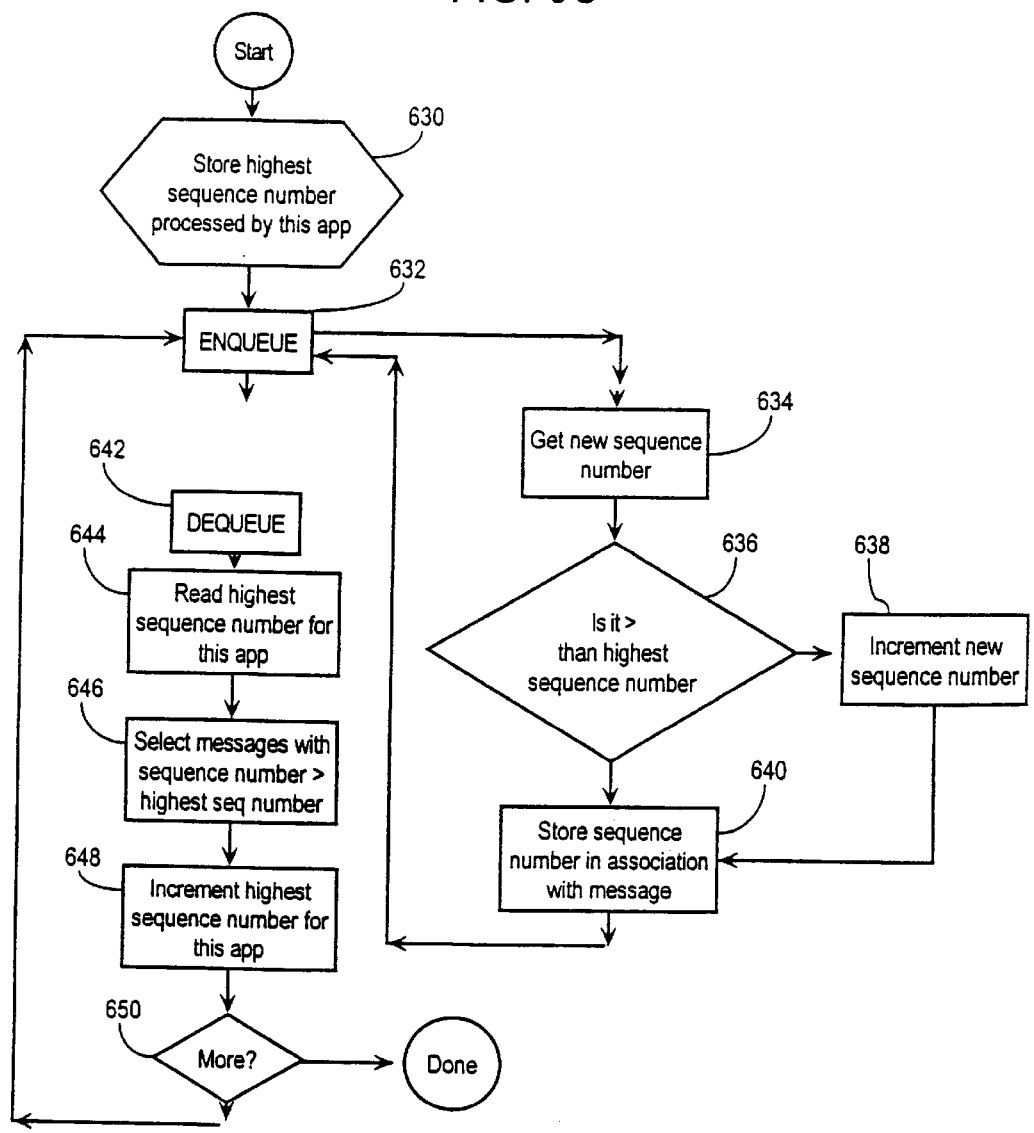
FIG. 6C is a flow diagram of sequence number processing.

In this embodiment, there is a need to ensure that each application that is consuming messages is allowed to dequeue a message exactly once and is never allowed to dequeue a message that was enqueued earlier than a previously dequeued message. The process shown in FIG. 6C accomplishes this requirement. Storage, such as a variable stored in main memory, is provided for each application that dequeues messages to store a value of the highest message sequence number processed by the application. Sequence numbers are obtained from a database server kernel process called a sequence. Sequences provide ever-increasing integer values that can be used as serial numbers and the like in database applications.

In step 630, each application stores the highest sequence number of messages processed thus far by the application. When a message enqueue operation is initiated, as shown in step 632, the process obtains a new sequence number from a sequence as shown in step 634. In step 636, the new sequence number is compared to the highest sequence number for the current application. If the new sequence number is greater than the highest sequence number, then in step 640 the new sequence number is stored in association with the message that is being enqueued.

When an application dequeues a message, as shown in step 642, the dequeue operation reads the highest sequence number of messages previously processed by the current application, as shown in step 644. Using an appropriate SQL statement or the equivalent, the dequeue operation then selects for dequeuing only messages that have a sequence number greater than the highest sequence number associated with the current application, as shown in step 646. Such selection is enabled by establishing an index on the queue table having the sequence number as principal key.

In step 648, the highest sequence number associated with the current application is incremented to a value equal to the highest sequence number of a message that was selected in step 646.

As shown in step 650, further processing operations can be carried out, or control can return to step 632 at which another enqueue operation is carried out.

Using this process, all applications that consume messages from a queue will receive messages in the same order. The time for an enqueue is not dependent on the number of messages that have been dequeued or the number of applications that have consumed messages.

In another preferred embodiment, an application can specify if a queue is enabled for multiple consumers. In one variation of this embodiment, the application specifies this preference when queue tables are created. Alternatively, the dequeue operation has an <appname> parameter that defaults to a NULL value. If no <appname> is specified, the dequeue operation skips the processes described above and selects messages without reference to indexes. In this way, an application can optimize operation when only a single application consumes messages from the queue.

Database Application Programming Using Enqueue and Dequeue Operations

The following pseudo-code presents an example API that can be used to implement the invention. Preferably, the API calls described below are integrated with the Oracle8 database system.

```
OCIEnqueue(OCISvcCtx        *svch,          /* service context(IN) */
           OCIError          *errh,          /* error handle(IN) */
           text queue_name,                  /* target queue for enqueue(IN)
                                                */
           OCIEnqueueOptions *enqueue_options,  /* options(IN) */
           OCIMessageProperties *message_properties,/* mesg properties(IN)
                                 */
           OCIType           *payload_tdo,   /* TDO of adt(IN) */
           dvoid             **payload,      /* pointer to pointer to instance
of ADT(IN) */
           dvoid             **payload_ind,  /* ptr to ptr to indicator
structure(IN) */
           OCIRaw            **msgid,        /* message id (OUT) */
           ub4 mode);                        /* not used (IN) */
OCIDequeue(OCISvcCtx        *svch,          /* service context(IN) */
           OCIError          *errh,          /* error handle(IN) */
           text              * queue_name,
                                             /* target queue for enqueue(IN) */
           OCIDequeueOptions *dequeue_options,  /* options(IN) */
           OCIMessageProperties **message_properties,
                                             /* properties(IN/OUT) */
           OCIType           *payload_tdo,              /* TDO of adt(IN) */
           dvoid             **payload,
                             /* ptr to pointer to instance of ADT(IN/OUT) */
           dvoid             **payload_ind
                             /* ptr to ptr to indicator structure(IN) */
           OCIRaw            **msgid,        /* message id (OUT) */
           ub4 mode);                        /* not used (IN) */
```

Preferably, the API includes three function calls that enable an application program to specify message options and message properties. In one embodiment, these function calls are named OCIEnqueueOptions or dbms_aq.enqueue_options_t, OCIMessageProperties or dbms_aq.message_properties_t, and OCIDequeueOptions or dbms_aq.dequeue_options_t. The table below lists the attribute names and attribute types for the three function calls.

| Handle | Attribute Name | Attribute Type |
|---|---|---|
| OCI_ENQUEUE_OPTIONS | OCI_VISIBILITY | ub4(OCI_ON_COMMIT/OCI_IMMEDIATE) |
| OCI_ENQUEUE_OPTIONS | OCI_RELATIVE_MSGID | OCIRaw * |
| OCI_ENQUEUE_OPTIONS | OCI_SEQUENCE_DEVIATION | ub4(OCI_BEFORE/OCI_TOP) |
| OCI_DEQUEUE_OPTIONS | OCI_CONSUMER_NAME | text * |
| OCI_DEQUEUE_OPTIONSOCI_DEQUEUE_MODE | | OCI_BROWSE, OCI_LOCKED, OCI_REMOVE |
| OCI_DEQUEUE_OPTIONS | OCI_NAVIGATION | ub4(OCI_FIRST_MESSAGE, OCI_NEXT_MESSAGE, OCI_NEXT_TRANSACTION) |
| OCI_DEQUEUE_OPTIONS | OCI_VISIBILITY | ub4(OCI_ON_COMMIT/OCI_IMMEDIATE) |
| OCI_DEQUEUE_OPTIONS | OCI_WAIT | ub4(OCI_FOREVER/OCI_NO_WAIT) |
| OCI_MESSAGE_PROPERTIES | OCI_PRIORITY | ub4 |
| OCI_MESSAGE_PROPERTIES | OCI_DELAY | ub4 |
| OCI_MESSAGE_PROPERTIES | OCI_EXPIRATION | ub4(OCI_NEVER) |
| OCI_MESSAGE_PROPERTIES | OCI_CORRELATION | text * |
| OCI_MESSAGE_PROPERTIES | OCI_ATTEMPTS | ub4 |
| OCI_MESSAGE_PROPERTIES | OCI_RECIPIENT_LIST | OCIColl * |
| OCI_MESSAGE_PROPERTIES | OCI_EXCEPTION_QUEUE | text * |
| OCI_MESSAGE_PROPERTIES | OCI_ENQUEUE_TIME | OCIDate (only OCIAttrGet) |
| OCI_MESSAGE_PROPERTIES | OCI_STATE | ub4 (only OCIAttrGet) |

Examples of Enqueue/Dequeue Operations Enqueue Followed by Dequeue

Table 3 is an example of SQL statements that may be used to command an embodiment of the invention to enqueue and then dequeue a single message without any other parameters. Only the queue name and the user data need to be specified. The programming language syntax of Table 3 and other tables herein is the syntax of the SQL language as implemented in an RDBMS, such as the Oracle® 7 RDBMS, and is well known in the art.

TABLE 3

Simple Enqueue/Dequeue

```
DECLARE
        my_msgid     number;
        my_user_data long raw := hextoraw ('7')
BEGIN
ENQUEUE (queue_name=>'my_queue',
enqueue_options=>my_enqueue_options, message_properties=>
my_message_properties, payload=>my_user_data,
message_identifier=>my_msgid);
        DEQUEUE (queue_name=>'my_queue',
dequeue_options=>my_dequeue_options,
message_properties=>output_message_properties,
        output_message_identifier=>my_msgid, payload=>my_user_data);
```

Enqueue and Dequeue by Priority

As shown in Table 4, when two messages are enqueued with the same priority, the message that was enqueued earlier will be dequeued first. However, if two messages have different priorities, the message with the higher priority will be dequeued first.

TABLE 4

Engueue/Dequeue Showing Effect of Priorities

```
{Application calls ENQUEUE}
DECLARE
        my_msgid number;
```

TABLE 4-continued

Engueue/Dequeue Showing Effect of Priorities

```
        my_priority    number;
        my_user_data   long raw := hextoraw('7');
BEGIN
ENQUEUE (queue_name=>'my_queue', priority=>2,
                payload=>my_user_data, message_identifier=>my_msgid);
{Upon completing the ENQUEUE, my_msgid=23}
{Application calls ENQUEUE again}
ENQUEUE (queue_name=>'my_queue', priority=>5,
                payload=>my_user_data, message_identifier=>my_msgid);
{Upon completing the ENQUEUE, my_msgid=24}
DEQUEUE (request_schema=>'my_queue', priority=my_priority,
                payload=>my_user_data);
END;
{Upon completing the DEQUEUE, message 24 will be retrieved before
                message 23 since priority 5 is superior to priority 2, even though the
                message identifier of message 23 is ordered in FIFO order earlier than
                message 24}
```

Non-destructive Dequeue Followed by Normal Dequeue

An application can browse (or "preview") a message without deleting the message from a queue, lock the message in the queue and retrieve the message identifier by using the steps described in Table 5:

TABLE 5

Non-destructive Dequeue Followed by Normal Dequeue

```
DECLARE
        lock_msgid     number;
        my_user_data   long raw := hextoraw('7');
DEQUEUE (queue=>'my_queue', dequeue_mode=>'L',
        message_identifier=>lock_msgid, payload=>my_user_data);
{a moment later, the application can remove the locked message from the
        queue as follows}
DEQUEUE (queue_name=>'my_queue', message_identifier=>
lock_msgid,
        payload=>my_user_data);
```

Enqueue Followed by Scheduled Dequeue

Applications can enqueue a message with a time window that restricts retrieval of the message to particular start and stop time periods. For example, if an application wants a message to be dequeued no earlier than one (1) week from now, but no later than three (3) weeks from now (which is two weeks from the earliest dequeue data), the message is enqueued with the following request:

```
DEQUEUE(queue_name=>'my_queue', delay=>system_date+7,
        expiration=>2*7*24*60*60, payload=>'my_data');
```

Using Sequence Deviation To Define Dequeue Order

At ENQUEUE time, the Relative Message Identifier and Sequence Deviation parameters can be used to specify the order in which messages are to be dequeued. This is advantageous when several messages have the same Priority value but an application wishes to specify which message should dequeue first. In the absence of sequence deviation, the earliest queued message (i.e., the message with the lowest Message Identifier) would dequeue first. For example, if an application is to enqueue three messages, and the messages are to be dequeued in the order (2, 1, 3), the process shown in Table 6 is used to enqueue the messages.

TABLE 6

Sequence Deviation

```
DECLARE
        my_msgid    number;
        my_msgid1   number;
        my_msgid2   number;
        dev_data    long raw := hextoraw('7');
{enqueue the first message}
ENQUEUE (queue_name=>'dev_queue',
        enqueue_options=>my_enqueue_options,
        message_properties=>my_message_properties,
        payload=>dev_data,
        message_identifier=>my_msgid);
{insert the second message, specifying that it should be enqueued ahead of
        message 1 }
ENQUEUE (queue_name=>'dev_queue',
        enqueue_options=>my_enqueue_options,
        message_properties=>my_message_properties,
        payload=>dev_data,
        relative_message_identifier=>my_msgid,
        sequence_deviation=>'B',
        message_identifier=>my_msgid 1);
{insert the third message}
ENQUEUE (queue_name=>'dev_queue',
        enqueue_options=>my_enqueue_options,
        message_properties=>my_message_properties,
        payload=>dev_data,
        message_identifier=>my_msgid2);
```

Normally, a newly enqueued message is added to the end of the queue and is processed after previously enqueued messages having equivalent Priority. Sequence Deviation is a process of enqueuing a message in an order different from a normal (FIFO) ordering sequence. In one embodiment, a set of related messages are organized as a Chain. Messages in a chain are related by the Relative Message Identifier that identifies the next message in the chain. Each Chain has a Chain Number that is stored in the Queue Table. Each Chain has a Local Order that is the order in which messages in the Chain are processed. A higher Local Order number indicates that a message should be processed earlier. The first message in a Chain is the Head of the Chain. The Delay value of all messages in a Chain must be in descending order starting from the Head. Further, Sequence Deviation will succeed only if a requesting process observes certain restrictions on the values of the Delay, Expiration, and Priority parameters. For a message with Sequence Deviation, the Delay value must be less than or equal to the Delay value of another message before which the current message is to be inserted. The Priority value of the current message must be greater than the Priority value of the other message. Thus, for a message M1 to be inserted in front of a message M that is currently in a queue, the following conditions must be true:

$$Delay(M1) <= Delay(M)$$

AND $$Priority(M1) > Priority(M)$$

The Sequence Deviation process within the ENQUEUE process operates in three possible ways depending on the value of the Sequence Deviation parameter in an ENQUEUE request. As shown in FIG. 4A, in step 400 the process tests whether the Sequence Deviation value is BEFORE, TOP, or NULL, and branches to one of three sub-processes accordingly. If the value is NULL, then no sequence deviation occurs; the message will be processed after any other queue message with the same priority has been processed. In step 402, the Chain Number value of the new message is set to null, because the message does not belong to a Chain, and the Local Order Number is set to zero. At step 404 the message is inserted into the queue, and the process is complete at step 406.

If the value is BEFORE then the new message is enqueued before or ahead of the queue message specified by the value of the Relative Message ID parameter (called the "referenced message" herein). In step 410 the process reads the Relative Message Identifier of the message passed in the ENQUEUE request, and reads the values in the Queue Table for the referenced message, including the Chain Number and Order Number of the referenced message. As shown in step 412, if the Chain Number of the referenced message is NULL (i.e., that message is not part of a Chain), then in step 414 the process obtains the next available chain number. Next, in step 416 the process assigns that value to the Chain Number column of the referenced message and the new message. In step 418, the process then selects messages matching that Chain Number, and having an Order Number higher than the Order Number of the referenced message, from the Queue Table using an SQL statement. In step 420 the process tests whether messages were retrieved by the SWL query. If not, then in step 422 the Order Number assigned to the new message is calculated by adding the Order Number of the referenced message to a Maximum Order Number and dividing by 2. If the select query returns a set of messages, then as shown in step 424 the lowest Order Number is chosen. Then in step 426 the Order Number assigned to the new message is calculated by adding that lowest Order Number to the Order Number of the message already in the queue and dividing by 2. During this process, the chain is locked. The BEFORE Sequence Deviation process is then complete and the ENQUEUE process resumes.

If the value is TOP, then the message is enqueued ahead of any other message of the same queue. No Relative Message Identifier needs to be specified. In step 430, the process reads the Queue Table Sort table values to determine before which message to insert the new message. If no such values are defined for the current queue, e.g., if the table query fails, then in step 434 the Enqueue Time values of queue messages are read from the queue table, and the earliest enqueue time is located. The message with the earliest enqueue time becomes the referenced message. In step 436 the Order Number of the current message is set to zero and the Chain Number is set to NULL.

Figure 4B:
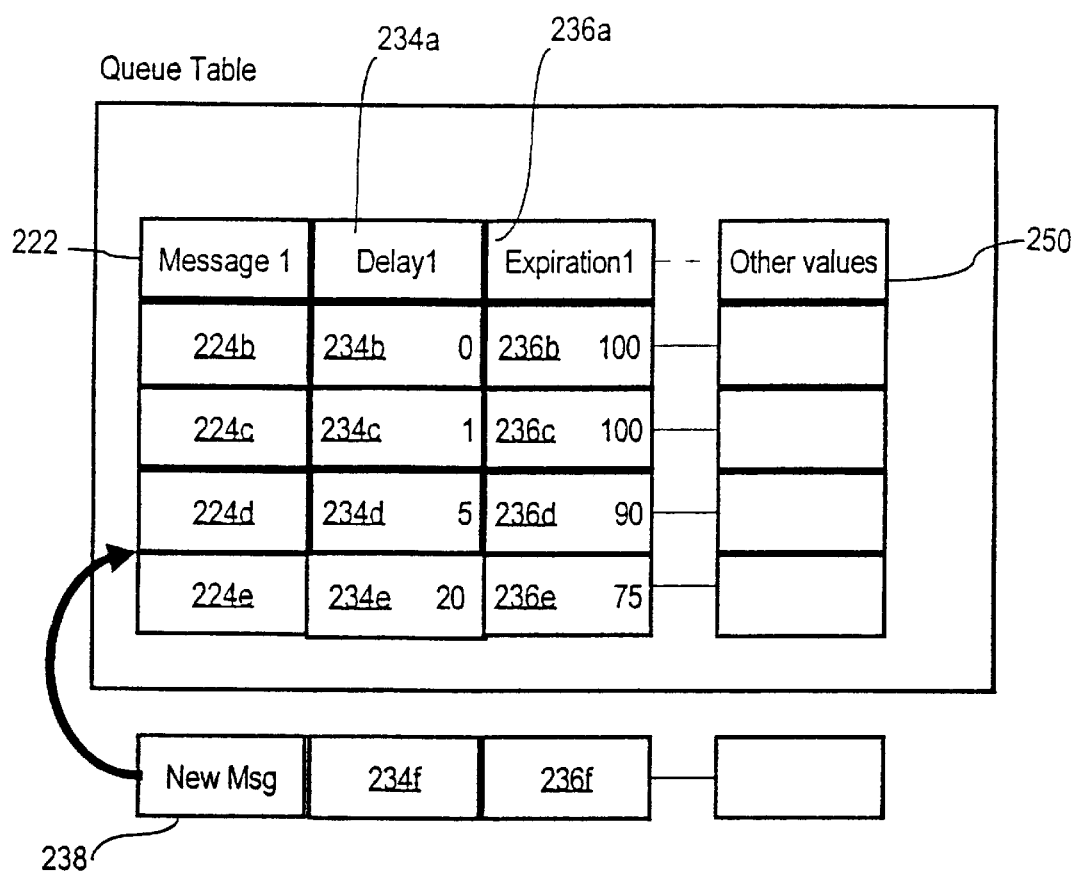
FIG. 4B is a block diagram of a queue insert operation with sequence deviation.

As shown in FIG. 4B, a queue table 220 can contain a queue 222 comprising a plurality of messages 224a, 224b, 224c, 224d, 224e. Each of the messages 224a–224e includes a Delay parameter value 234a–234e and a Priority value 236a–236e. The messages 224a–224e are ordered in the queue such that the message 224a with the highest Priority value (100) and the lowest Delay value (0) is at the top. Successive messages have increasingly higher Delay values and increasingly lower Priority values. Each message can have other parameters 250a–250e. The system receives an ENQUEUE request for another message 238 with the Sequence Deviation parameter set to BEFORE and the Relative Message Identifier set to Message 5 (224e). The Delay value 234f of message 238 is 10 and its Priority value 236f is 80. The ENQUEUE request will succeed because Delay value 234f is less than Delay value 234e and Priority value 236f is greater than Priority value 236e.

Time Manager Process

The queuing system further includes a Time Manager process which uses the Delay and Expiration parameter values of an ENQUEUE request to time message delays and notify the DEQUEUE process that a delay is complete. Other functions of the Time Manager process include deleting expired messages from the Queue Table 200 and moving expired messages to an Exception Queue 206. In one embodiment, the Time Manager process communicates with the Timetable database table 216, and is configured as a background process running on the same computer, server, machine or process that is running the queuing system. The Time Manager process uses existing inter-process communications facilities in the database server 310 kernel to communicate with other processes such as ENQUEUE.

When the queuing system is started, the Time Manager process is initialized by creating the Timetable 216, creating an index for the Timetable 216 based upon its Time column, and entering a row identifying the Timetable 216 in the Queue Table 200. Preferably initialization of the Time Manager process is triggered by placing a parameter aq_tm_processes in an initialization parameter file of the database system with which the queue system is integrated. After initialization, the time manager process can be started and stopped using procedures called START_TIME_MANAGER and STOP_TIME_MANAGER.

As described herein, the ENQUEUE process writes rows into the Timetable 216 when the Delay or Expiration parameters of an enqueued message 208 contain values.

FIG. 6B, is a flow diagram of Delay and Expiration processing. In step 620, a determination is made as to whether the Delay and Expiration parameters of an enqueued message 208 have values that are greater than zero. If the Delay and Expiration parameters have values that are greater than zero, then at step 622 the ENQUEUE process inserts the referenced message into the Timetable 216. At step 624, it is determined if the value of the SGA variable in the ENQUEUE request is greater than the values of the Delay and Expiration parameters of the enqueued message 208. If the value of the SGA variable in the ENQUEUE request is greater than the values of the Delay and Expiration parameters, then at step 626, the ENQUEUE process posts the time manager, when the Time Manager process is started, in step 700 it reads rows in the Timetable 216 and in step 702 tests whether the Timetable is empty. If so, then control returns to step 700 and the Time Manager essentially goes to sleep until ENQUEUE writes a row into the Timetable. If a Timetable row is found, in step 704 the Time Manager reads all entries in the Timetable to locate the message row with the least Time value. In step 706, the Time Manager sets an internal timer or alarm variable to such least Time value. In step 708, the Time Manager tests whether the alarm value is equal to the system clock time, i.e., whether the Time Manager should wake up and start substantive processing.

If the Time Manager should wake up, control is passed to step 710. Step 710 is also reached when the process is awakened from an external signal, e.g., a message posted by the ENQUEUE process. Therefore, in step 710 the process tests whether the alarm went off or whether the process has been externally posted. If the alarm went off, then in step 712 of FIG. 7B the process locates a row in the Timetable having a Time value equal to the alarm time. In step 714 the process tests the Exp__Or__Del value to determine whether the Time is an Expiration or Delay value. If it is a Delay value, then the process must next determine whether the message is unexpired, i.e., whether the Expiration value is not NULL, in step 716. If there is an Expiration value, in step 718 the value is copied into the Time column of the Timetable. In step 720 the process checks whether another message in the Timetable has the same alarm time, and if so, control is passed to step 714 to repeat the process for such other messages.

If the Expiration value is NULL at step 716, then at step 722 the process deletes the message from the Timetable, and then notifies the DEQUEUE process that the formerly delayed message is ready for processing.

If the alarm time is an Expiration time, then the test of step 714 will be negative and control is passed to step 726 in which the process reads the message and all its values from the Timetable. In step 728 the process checks whether the message is still in the original queue of the Queue Table, i.e., whether the message has been dequeued and processed. If the message is no longer in the queue, control is passed to step 720 to check for other messages. If the message is in the queue, then in step 730 the process determines the name of an exception queue to use, either the default exception queue or the name in the Exception Queue column of the message. In step 732 the process moves a copy of the message to the designated Exception Queue, and then deletes the message from the Timetable (step 734).

If the Time Manager awoke due to posting by ENQUEUE, as shown in step 740 of the FIG. 7C, then the Time Manager will reset its alarm time to Time value of the enqueued message, or the minimum time it has processed at that point. This is done by reading the value of the SGA variable in the ENQUEUE request, if there is one (steps 742, 746). The SGA variable stores the minimum absolute time processed by the Time Manager so far. Alternatively, the Time value is selected by choosing a message with a minimum time value from the Timetable and using its Time value. In this way, the Time Manager resets its alarm so that the alarm is never later than the Delay or Expiration value of a just-enqueued message. Without these steps, the Time Manager alarm could go off after the Time value of the just-enqueued message, causing the system to miss an event.

Configuration and Administration of Queues

Security and Access Privileges

The queuing system includes computer program segments, which can cause a computer to carry out steps to enable configuration, management, and administration of queues. Incorrect usage of administration processes can adversely affect database system performance; therefore, in one embodiment, the configuration and administration processes of the system are accessible only to human users having the system administrator privilege.

In another embodiment, the system is provided with means to define a queue administrator role and a queue user role for queue administrators and queue users, respectively. A user, process or application assigned the queue administrator role is permitted to access the queue administration processes and the queue use processes described herein. A user, process or application assigned the queue user role is permitted to access the queue use processes described herein. The system includes access definitions for these roles in a manner consistent with the access control mechanism used by the relational database system, and that access control mechanism (which is well known) carries out the steps of granting and revoking access privileges to particular users according to the role definitions. For example, when the queue system is configured for use with an Oracle® 7 RDBMS, the <grant> and <revoke> commands can be used by the system administrator to assign such roles and security privileges to specific users or user accounts.

In another embodiment, the queuing system is integrated with the Oracle8 database system. The queuing system is implemented as software packages called DBMS__AQADM and DBMS__AQ. The packages are owned by the system user, SYS, and they operate under SYS's security domain. Accordingly, a user who has been granted the security privilege called AQ__ADMINISTRATOR__ROLE can create, drop, start and stop queues. Similarly, a user who has been granted AQ__USER__ROLE role can enqueue and dequeue to any queues. If additional security is required, an application program can provide a wrapper on top of DBMS__AQADM and DBMS__AQ that will limit the application users to access or manage a specific set of queues.

Queue Table Creation

The system includes a CREATE__QTABLE process or computer program element that comprises computer program steps that carry out the following processes with effects on the system and its components as described below. The CREATE__QTABLE process accepts the parameters shown in Table 7:

TABLE 7

| CREATE QTABLE Parameters |
| --- |
| Queue Table |
| Queue Payload Type |
| Storage Clause |
| Sort List |
| Multiple__Consumers |
| Message__Grouping |
| User Comment |
| Auto__Commit |

When called from an SQL statement by an application program, CREATE__QTABLE creates a table in the relational database system to keep messages of queues, and a read-only RDBMS view usable by application programs for querying queue data. Parameters of the CREATE__QTABLE process operate as follows:

Sort List: The CREATE__QTABLE process is configured to accept a default queue order in the Sort List parameter. The Sort List parameter preferably is a character string containing a list of <sort__column, sort__order> pairs, each pair separated by commas from the next pair. Each <sort__column, sort__order> pair identifies a Queue Table 200 column used as a sort key by the DEQUEUE process. For example, if a Sort List value contains a list including the pair <sort__column__n, sort__order__n>, the pair identifies the column in the Queue Table that will be used as the nth sort key when the rows are ordered for dequeuing. The sort__order__n element of the pair specifies the order in which the column sort__column__n should be sorted. FIFO order is used by the DEQUEUE process by default. After a queue table is created using CREATE_QTABLE, the CREATE_QTABLE process assigns the default sort order of the queue table to all queues in the table. Once the sort order is created, it cannot be changed. However, an application program can retrieve messages in a different order using the DEQUEUE process and by providing values for the Message Identifier or Correlation Identifier parameters.

Queue Table: specifies the name of the new queue table to be created.

Queue Payload Type: this parameter specifies the abstract data type of the user data that will be stored in the queue. If the Queue Payload Type parameter is not specified or has a NULL value, a queue of variant data type will be created. If the Queue Payload Type parameter is specified and has a non-NULL value, the abstract data type specified must exist when CREATE_QTABLE is called or requested.

Storage_Clause: the value of this parameter specifies the storage format for the new queue table. The value of this parameter enables, for example, a large binary object such as a graphic image to be stored in a location apart from the queue, yet still referenced within a queue. In this way, queue operations are not burdened or slowed by manipulating large binary files or objects.

User Comment: the value of this parameter is a user-specified description of the queue table; it is added to the queue catalog in the RDBMS.

Multiple_Consumers: The value of this parameter specifies the message grouping behavior for queues created in the table. When Multiple_Consumers is set to NONE, each message is treated individually. When Multiple_Consumers is set to TRANSACTIONAL, messages enqueued as part of one transaction are considered part of the same group and must be dequeued as a group of related messages.

The Auto_Commit parameter stores a Boolean value. When Auto_Commit is TRUE, the DEQUEUE process causes the current transaction, if any, to commit before the operation is carried out. The operation becomes persistent when the call returns. TRUE is the default value. When Auto_Commit is FALSE, the dequeue operation is assumed to be part of the current transaction, so that removal of a message from the queue persists only when the calling process or program issues a transaction commit instruction.

In operation, when the CREATE_QTABLE process is invoked for a named queue table, the process checks whether the queue table exists in the Queue Table Dictionary Table. If the queue table does not exist in the dictionary table, the process also checks whether the named queue table exists in the system anyway. If not, a new queue table is created. In either case, the dictionary table is updated to reflect the new queue table or the existing queue table found in the system. These steps are carried out to account for the possibility that a queue table could be created but not entered into the dictionary table due to a system failure.

Information about the queue ordering parameters is inserted into the Queue Table Sort table. The Sort List value is parsed, and each Sort Column found therein is inserted as a row into the Queue Table Sort table. An index is created on the sort order columns. A view is created that allows a user to query the message data. The queue table view also provides the dequeue history for single consumer queue messages. To query the list of recipients or the dequeue history of a message in a multiple-consumer queue, a calling application program or process may query the queue table for the message of interest using an SQL query.

The CREATE SEQUENCE SQL statement is used to generate a message identifier for messages in the queues of the queue table. Last, the default exception queue is created.

Queue Table Deletion

The system includes a DROP_QTABLE process or computer program element that comprises computer program steps that carry out the following processes with effects on the system and its components as described below. The function of the DROP_QTABLE process is to delete or drop entire queue tables, and all queues within them, from storage in the system. The DROP_QTABLE process accepts three parameters: the Queue Table name to drop; a Force parameter, and an Auto_Commit parameter. The Force parameter accepts a Boolean value. If the Force value is TRUE, then all queues in the named queue table are stopped and dropped by deleting their tables and reclaiming memory used for their storage. If the Force value is FALSE, then the system will not stop queues in the queue table. An administrator must separately stop them before they can be dropped. The Auto_Commit parameter accepts a Boolean value; a TRUE value specifies that the current transaction, if any, must commit before the drop operation is carried out. When Auto_Commit is FALSE, then the drop operation is part of the current transaction and will become persistent only when the calling process or program issues a commit instruction.

Queue Creation

The system includes a CREATE_Q process or computer program element that comprises computer program steps that carry out the following processes with effects on the system and its components as described below. The function of the CREATE_Q process is to create a specific, uniquely named queue in the Queue Dictionary Table and in storage in the system. The CREATE_Q process operates using the parameters shown in Table 8:

TABLE 8

CREATE Q Process Parameters

Queue Name
Queue Table
Queue Type
Maximum Retries
Retry Delay
Retention Time
Auto_Commit
User Comment Placing values in these parameters and calling the CREATE_Q process causes the CREATE_Q process to create a new queue and add its configuration information into the queue dictionary table 210 using the steps described below. All queue names must be unique within a schema. Creating a queue does not enable it to be used immediately; the START_Q operation starts the queue and enables it to be accessed by an application program. By default, a queue is created with both ENQUEUE and DEQUEUE operations disabled.

Queue Name: the value of this parameter is a unique name for the new queue.

Queue Table: the value of this parameter is the name of the queue table containing the new queue.

Queue Type: the value of this parameter indicates whether the new queue is a normal queue or an exception queue. Preferably, to indicate this, the parameter can store values of NORMAL_QUEUE or EXCEPTION_

QUEUE. Enqueue operations cannot be carried out on an exception queue by an application program, only dequeue operations can.

Maximum Retries: the value of this parameter is the number of times that an application program may retry processing messages retrieved from the new queue, such as 1 to 20 times. The default value is zero, which means that no retries are allowed.

Retry Delay: the value of this parameter is the time in seconds before a message in the queue will be scheduled for processing if processing of the message fails and an application rolls the message back to the queue. The default value is zero, which means that the message should be retried as soon as possible. The Retry Delay parameter has no effect if Maximum Retries is zero, since in that case no retries are allowed.

Retention Time: the value of this parameter is the number of days for which a message should be kept (retained) in the queue, after which the message is deleted. Its value may range from zero to INFINITE. When Retention Time is INFINITE, the message is retained indefinitely. When Retention Time is set to zero, which is the default, the message is not retained after dequeuing.

The Auto_Commit parameter operates in the same manner as described above in connection with the CREATE_QTABLE process.

In operation, the CREATE_Q process first tests whether the named queue already exists; if not, a new row is inserted into the Queue Dictionary Table. A unique queue identifier is then generated for the new queue.

Dropping Queues From a Queue Table

The system includes a DROP_Q process or computer program element that comprises computer program steps that carry out the following processes with effects on the system and its components as described below. The function of the DROP_Q process is to delete or drop a specific, uniquely named queue from an existing queue table and from storage in the system. The DROP_Q process accepts two parameters, Queue Name and Auto_Commit. The Queue Name parameter identifies the queue to be dropped. The Auto_Commit parameter accepts a Boolean value; a TRUE value specifies that the current transaction, if any, must commit before the drop operation is carried out. When Auto_Commit is FALSE, then the drop operation is part of the current transaction and will become persistent only when the calling process or program issues a commit instruction. When DROP_Q is called or executed, it deletes configuration information for the named queue from the queue dictionary table. However, unless the STOP_Q process (defined herein) has been called first, and the named queue has stopped, DROP_Q will not delete queue information and will return an error message.

Altering an Existing Queue

The system includes an ALTER_Q process or computer program element that comprises computer program steps that carry out the following processes with effects on the system and its components as described below. The function of the ALTER_Q process is to change information relating to an existing queue in an existing queue table and in storage in the system. In one embodiment, only specific parameter values of an existing queue can be modified. For example, in one embodiment, ALTER_Q is called with parameters Queue Name, Maximum Retries, Retry Delay, Retention Time, and Auto_Commit. When called in this manner with values in the named parameters, ALTER_Q changes any existing values for the queue named Queue Name to the values in the parameters. In another embodiment, ALTER_Q is called with parameters Queue Name, and all the other parameters of a queue identified in the description of CREATE_Q. In this embodiment, ALTER_Q will change any or all of the parameters that are supplied.

Starting and Stopping a Queue

The system includes START_Q and STOP_Q processes or computer program elements that comprise computer program steps to carry out the following processes with effects on the system and its components as described below. The function of the START_Q process is to enable DEQUEUE or ENQUEUE operations to be carried out on a named queue. The function of the STOP_Q process is to disable DEQUEUE and ENQUEUE functions of a named queue.

The START_Q process accepts parameters Queue Name, Enqueue, and Dequeue. The value of the Queue Name parameter identifies the name of the queue to be started. The Enqueue and Dequeue parameters take Boolean values. If Enqueue is TRUE for a particular queue, then enqueue operations may be carried out on the named queue by the ENQUEUE process described herein. If Dequeue is TRUE, then dequeue operations may be carried out on the named queue by the DEQUEUE process described herein. A FALSE value disables the named operation. The Dequeue and Enqueue parameters each have default values of TRUE.

Figure 5:
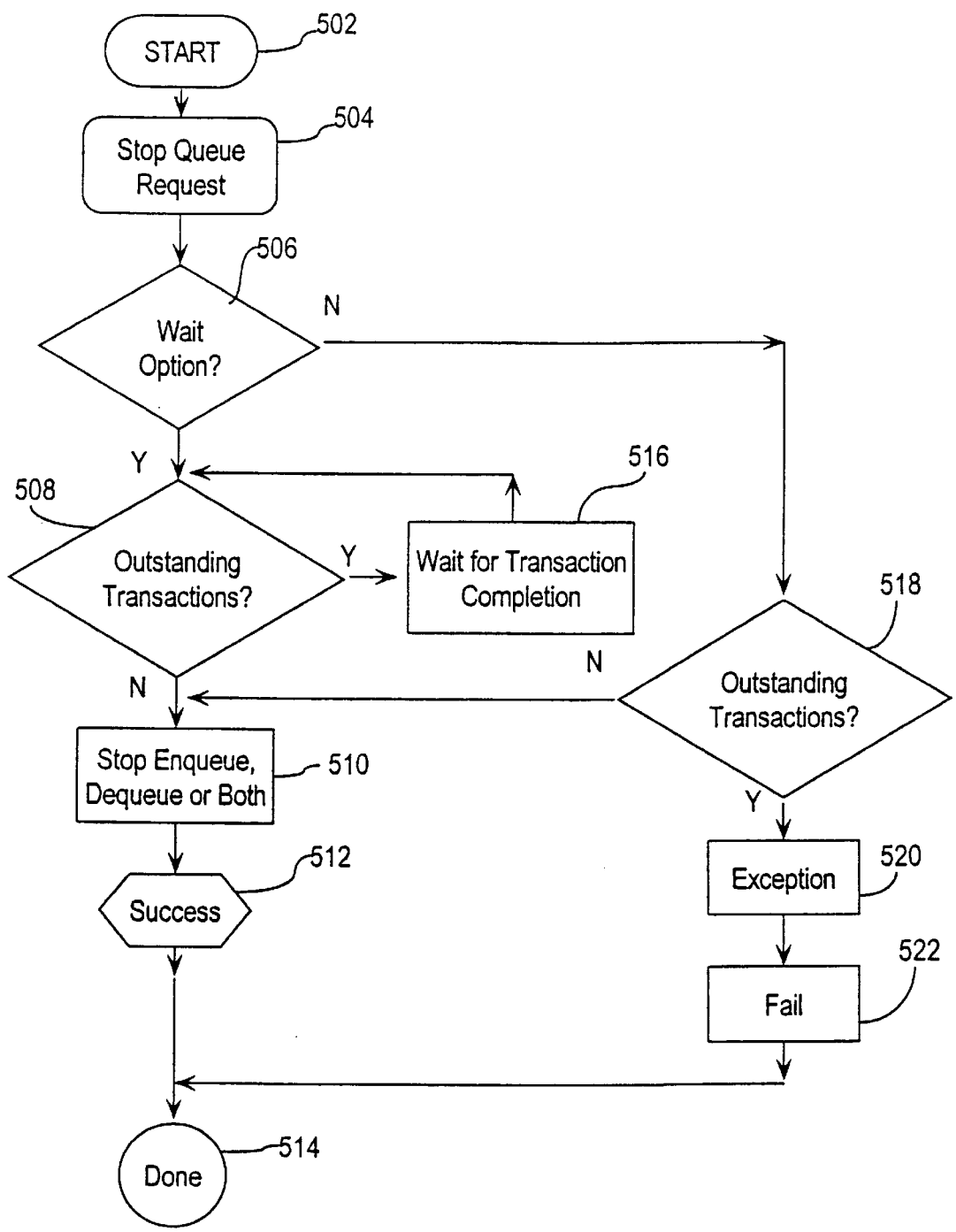
FIG. 5 is a flow diagram of a Stop Queue process.

The STOP_Q process accepts parameters Queue Name, Enqueue, Dequeue, and Wait. The value of Queue Name gives the name of a queue to be stopped. The Enqueue and Dequeue parameters take Boolean values indicating whether enqueue or dequeue operations are to be disabled (TRUE) or permitted (FALSE). Thus, the Enqueue and Dequeue parameters take values opposite from the equivalent parameters in the START_Q process. For STOP_Q, the default value is TRUE for both Enqueue and Dequeue, meaning that both will be disabled. The value of the Wait parameter is Boolean and indicates whether the system should wait for completion of outstanding transactions before Enqueue or Dequeue are disabled. The steps taken by STOP_Q to process the Wait parameter are shown in FIG. 5. Processing starts at step 504 when the STOP_Q process is called or requested by an application program. In step 506, the process tests whether the WAIT option is set, i.e., whether the value of the Wait parameter is TRUE. If so, then in step 508 the process tests whether outstanding (incomplete) transactions are defined in the system. If not, control is passed to step 510, in which the process tests the Dequeue and Enqueue parameter values and inhibits dequeue or enqueue processes, respectively, if such values are TRUE. Thereafter the process returns a successful result in step 512 and concludes.

If the WAIT option is set but outstanding transactions exist, then control is passed to step 516 in which the process waits for such transactions to complete. Thereafter the process again tests for outstanding transactions in step 508. Thus, the process essentially hangs or executes an infinite loop until all outstanding transactions are completed, and then continues to step 510 and successor steps as described above.

If the WAIT option is not set (Wait is FALSE), then in step 518 the process tests whether outstanding transactions are recognized by the system. If not, then control is passed to step 510 and the process disables enqueuing, dequeuing, or both, as described above. If outstanding transactions exist (step 518 is affirmative), then the process generates an error message or an exception at step 520. The process thereafter fails to carry out the disabling functions of step 510, and returns control to the calling process or program.

Loading Queue Tables Into The ache and Altering Them

The queuing system includes functions to load queue tables into the KGL cache, reading queue tables from the cache into main memory, and altering queue tables in the cache. In one embodiment, the process for initially loading queue tables into the cache includes the steps of: allocating memory, e.g. in the memory 104; initializing a queue table object in the memory; selecting the desired queue from the queue table stored in non_volatile memory; storing the queue table data in the queue table object; generating a DEQUEUE statement in the SQL language; and for every queue message of the queue, loading the message into the queue table object in the pre-defined sort order of the Queue Table Sort table.

To read queue objects, kernel functions of the database server are used to read queue objects from the disk and place them in the library cache.

To alter a queue table entry in the Queue Table Dictionary Table, a process is provided comprising the steps of locking the queue table; modifying the queue table using SQL statements and carrying out such modification in non-volatile storage; purging the queue table object from the cache; and releasing the queue table lock. In this way, the next request for the queue table forces the database server kernel to copy the updated queue table from the non-volatile storage to the cache.

Updating Disk Files and Purging the Cache

Generally, queue tables have been found to be modified infrequently.

Therefore, the foregoing administration processes are configured to modify queue table data directly in the data files stored in non-volatile storage, and to then purge the volatile copy of each queue table object from the cache. In this way, data updates are directed to a disk or other non-volatile storage rather than the cache, and the cache is then purged. Subsequent attempts by a process to access a queue table force the system to read the queue table from the disk and copy it into the cache.

Processing Subscribers

A publish-and-subscribe model of message flow is supported by processes in the system that permit external agents, processes, programs, or individuals to be added as subscribers to a queue. When an agent is a subscriber to a queue, all messages enqueued to the queue are copied to the agent. Preferably, a queue must have the multiple consumers attribute enabled in order to participate in subscription, because any subscriber is permitted to dequeue messages from such a queue.

To add subscribers to a queue, the system has an ADD_SUBSCRIBER procedure that accepts Queue Name and Subscriber parameters. The value of the Queue Name parameter identifies the queue to whom the subscriber is being added. The Subscriber parameter is of type Agent, and stores information identifying the agent or process that is subscribing to the named queue. When ADD_SUBSCRIBER is called, the named subscriber is added to a list of subscribers stored in association with the named queue.

The system also has a REMOVE_SUBSCRIBER process that performs the symmetric task of removing a subscriber from the list for a named queue. The REMOVE_SUBSCRIBER procedure also accepts Queue Name and Subscriber parameters. When REMOVE_SUBSCRIBER is called, the procedure takes action immediately and causes whatever transaction contains the call to commit. All references to the named subscriber that are stored in existing messages are removed as part of the operation.

The system also has a QUEUE_SUBSCRIBERS function that will return a list of subscribers for a named queue to a calling program. Preferably, the QUEUE_SUBSCRIBERS function accepts two parameters, Queue_Name and Subscriber_List. The function is called with the Queue Name parameter set to a value identifying the desired queue. The function returns a list of agents in the Subscriber_List parameter.

Thus, an advanced message queuing system has been described which offers significant advances over the prior art. The system is tightly integrated with a database system, taking advantage of the superior operational characteristics (such as performance, scalability, and reliability) of a database system. The system offers ease of programming, because application programs no longer require a separate database and MOM product. As a result, an application program does not have to be compatible with two separate programming models. The system offers transactional integrity, because a single transaction applies to both the database and the queue. Therefore, consistency is maintained with no extra effort on the part of the application program.

Still another advantage of the disclosed system is coordinated recovery. According to the invention, a single transaction log is maintained. This enables faster and more coordinated recovery from failure than separate MOM and database products, which require two transaction logs.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for receiving, queuing and executing messages in a database system in a computer system including a memory, comprising the steps of:

establishing a queue in the memory using a table of the database system;

receiving to the queue at least one message comprising message meta-data and message user data, said message meta-data including a condition for executing said message;

waiting until said condition is satisfied;

executing said message by an application program; and retaining said message in said queue.

2. The method recited in claim 1, wherein the step of establishing a queue in memory includes the step of establishing a queue table in which the queue is stored.

3. The method recited in claim 1, wherein the step of establishing a queue in memory includes the step of establishing a dictionary table in the memory, said dictionary table comprising descriptive information about said queue.

4. The method recited in claim 1, wherein the step of receiving a message to the queue includes the step of receiving to the queue a message comprising an abstract data type.

5. The method recited in claim 1, wherein the step of receiving a message to the queue includes the step of receiving to the queue a message comprising a large object binary handle identifying a location of a large object binary attachment.

6. The method recited in claim 1, wherein the step of receiving to the queue a message includes the step of receiving to the queue a message comprising a reference to a second message in a second queue.

7. The method recited in claim 6, wherein the step of executing said message includes the steps of:
(d1) establishing a transaction comprising said message and said second message; and
(d2) forwarding said transaction to a third queue.

8. The method recited in claim 1, wherein the step of establishing a queue in memory includes the step of establishing said queue in a meta-data cache of said database system.

9. The method recited in claim 1, further comprising the steps of: dequeuing said message from said queue; retaining said message in said queue; and dequeuing said message from said queue again.

10. The method recited in claim 1, further comprising the steps of:
establishing an exception queue in said table; raising an exception if said application program cannot process said message; attempting to process said message a plurality of times; and enqueuing said message in said exception queue exception when said application program cannot process said message.

11. The method recited in claim 1, wherein the step of receiving a message to said queue includes the steps of reading an order for said message from an order table and enqueuing said message in said table in said order.

12. The method recited in claim 1, wherein the step of receiving a message to said queue includes the step of receiving a message comprising a priority of said message in said queue.

13. The method recited in claim 1, wherein the step of receiving a message to said queue includes the steps of: establishing in said queue a first message including a first priority within said queue; receiving a second message including a second priority higher than said first priority; and inserting said second message in said queue in a superior position with respect to said first message.

14. The method recited in claim 1, wherein the step of receiving a message to said queue includes the step of establishing a message in said queue wherein said message comprises a start time and an end time for describing when said message is to be executed.

15. The method recited in claim 14, wherein the step of executing said message includes the step of executing said message only after said start time and before said end time.

16. The method recited in claim 1, wherein the step of waiting until said condition is satisfied includes the step of waiting until execution of a second message referenced in said meta-data of said message.

17. The method recited in claim 1, wherein the step of receiving to the queue a message includes the step of receiving to the queue a message comprising a correlation identifier, which describes a message to a user.

18. The method recited in claim 1, wherein the step of receiving to the queue a message includes the step of receiving to the queue a message comprising a name of a reply message queue in said database system, and wherein the step of executing said message includes the step of enqueuing an execution result of said message in said reply message queue.

19. The method recited in claim 1, wherein the step of receiving to the queue a message includes the step of receiving to the queue a message comprising a security context of said message.

20. A computer system comprising:
a processor; and
a memory coupled to said processor; the memory having stored a queue using a table of a database system; and
sequences of instructions which, when executed by said processor, cause said processor to
receive, queue and execute a message in the database system by causing the processor to perform the steps of:
(a.) receiving to the queue at least one message comprising message meta-data and message user data, said message meta-data including a condition for executing said message;
(b.) waiting until said condition is satisfied;
(c.) executing said message by an application program; and
(d.) retaining said message in said queue.

21. The system of claim 20, wherein said memory further comprises a queue table in which said queue is stored.

22. The system of claim 20, wherein said memory further a dictionary table in the memory, said dictionary table comprising descriptive information about said queue.

23. The system of claim 20, wherein said sequence of instructions further comprises instructions causing said processor to receive to the queue a message comprising an abstract data type.

24. The system of claim 20, wherein said sequence of instructions further comprises instructions causing said processor to receive to the queue a message comprising a large object binary handle identifying a location of a large object binary attachment.

25. The system of claim 20, wherein said sequence of instructions further comprises instructions causing said processor to receive to the queue a message comprising a reference to a second message in a second queue.

26. The system of claim 25, wherein said sequence of instructions further comprises instructions causing said processor to:
(d1) establish a transaction comprising said message and said second message; and
(d2) forward said transaction to a third queue.

27. The system of claim 20, wherein said queue is stored in a meta-data cache of said database system.

28. The system of claim 20, wherein said sequence of instructions further comprises instructions causing said processor to dequeue said message from said queue; retain said message in said queue; and dequeue said message from said queue again.

29. The system of claim 20, wherein said memory further comprises an exception queue in said table and wherein said sequence of instructions further comprises instructions causing said processor to raise an exception if said application program cannot process said message; attempting to process said message a plurality of times; and enqueuing said message in said exception queue exception when said application program cannot process said message.

30. The system of claim 20, wherein said sequence of instructions further comprises instructions causing said processor to read an order for said message from an order table and enqueue said message in said table in said order.

31. The system of claim 20, wherein said sequence of instructions further comprises instructions causing said processor to receive a message comprising a priority of said message in said queue.

32. The system of claim 20, wherein said memory further comprises in said queue a first message including a first priority within said queue; wherein said sequence of instructions further comprises instructions causing said processor to receive a second message including a second priority higher than said first priority; and insert said second message in said queue in a superior position with respect to said first message.

33. The system of claim 20, wherein said memory further comprises a message in said queue wherein said message comprises a start time and an end time for describing when said message is to be executed.

34. The system of claim 33, wherein said sequence of instructions further comprises instructions causing said processor to execute said message only after said start time and before said end time.

35. The system of claim 20, wherein said sequence of instructions further comprises instructions causing said processor to wait until execution of a second message referenced in said meta-data of said message.

36. The system of claim 20, wherein said sequence of instructions further comprises instructions causing said processor to receive to the queue a message comprising a correlation identifier, which describes a message to a user.

37. The system of claim 20, wherein said sequence of instructions further comprises instructions causing said processor to receive to the queue a message comprising a name of a reply message queue in said database system, and wherein the step of executing said message includes the step of enqueuing an execution result of said message in said reply message queue.

38. The system of claim 20, wherein said sequence of instructions further comprises instructions causing said processor to receive to the queue a message comprising a security context of said message.

39. A computer-readable medium having stored thereon a plurality of sequences of instructions, said plurality of sequences of instructions including sequences of instructions which, when executed by a processor, cause said processor to perform the steps of:
   establishing a queue in a memory coupled to a processor using a table of a database system in said memory and executed by said processor;
   receiving to the queue at least one message comprising message meta-data and message user data, said message meta-data including a condition for executing said message;
   waiting until said condition is satisfied;
   executing said message by an application program in said memory and executed by said processor; and
   retaining said message in said queue.

40. The computer-readable medium recited in claim 39, wherein the instructions causing the processor to execute the step of establishing a queue in memory include instructions causing the processor to execute the step of establishing a queue table in which the queue is stored.

41. The computer-readable medium recited in claim 39, wherein the instructions causing the processor to execute the step of establishing a queue in memory include instructions causing the processor to execute the step of establishing a dictionary table in the memory, said dictionary table comprising descriptive information about said queue.

42. The computer-readable medium recited in claim 39, wherein the instructions causing the processor to execute the step of receiving a message to the queue include instructions causing the processor to execute the step of receiving to the queue a message comprising an abstract data type.

43. The computer-readable medium recited in claim 39, wherein the instructions causing the processor to execute the step of receiving a message to the queue include instructions causing the processor to execute the step of receiving to the queue a message comprising a large object binary handle identifying a location of a large object binary attachment.

44. The computer-readable medium recited in claim 39, wherein the instructions causing the processor to execute the step of receiving to the queue a message include instructions causing the processor to execute the step of receiving to the queue a message comprising a reference to a second message in a second queue.

45. The computer-readable medium recited in claim 44, wherein the instructions causing the processor to execute the step of executing said message include instructions causing the processor to execute the steps of:
   (d1) establishing a transaction comprising said message and said second message; and
   (d2) forwarding said transaction to a third queue.

46. The computer-readable medium recited in claim 39, wherein the instructions causing the processor to execute the step of establishing a queue in memory include instructions causing the processor to execute the step of establishing said queue in a meta-data cache of said database system.

47. The computer-readable medium recited in claim 39, further comprising instructions causing the processor to execute the steps of: dequeuing said message from said queue; retaining said message in said queue; and dequeuing said message from said queue again.

48. The computer-readable medium recited in claim 39, further comprising instructions causing the processor to execute the steps of: establishing an exception queue in said table; raising an exception if said application program cannot process said message; attempting to process said message a plurality of times; and enqueuing said message in said exception queue exception when said application program cannot process said message.

49. The computer-readable medium recited in claim 39, wherein the instructions causing the processor to execute the step of receiving a message to said queue include instructions causing the processor to execute the steps of reading an order for said message from an order table and enqueuing said message in said table in said order.

50. The computer-readable medium recited in claim 39, wherein the instructions causing the processor to execute the step of receiving a message to said queue include instructions causing the processor to execute the step of receiving a message comprising a priority of said message in said queue.

51. The computer-readable medium recited in claim 39, wherein the instructions causing the processor to execute the step of receiving a message to said queue include instructions causing the processor to execute the steps of: establishing in said queue a first message including a first priority within said queue; receiving a second message including a second priority higher than said first priority; and inserting said second message in said queue in a superior position with respect to said first message.

52. The computer-readable medium recited in claim 39, wherein the instructions causing the processor to execute the step of receiving a message to said queue include instructions causing the processor to execute the step of establishing a message in said queue wherein said message comprises a start time and an end time for describing when said message is to be executed.

53. The computer-readable medium recited in claim 39, wherein the instructions causing the processor to execute the step of executing said message include instructions causing the processor to execute the step of executing said message only after said start time and before said end time.

54. The computer-readable medium recited in claim 39, wherein the instructions causing the processor to execute the step of waiting until said condition is satisfied include instructions causing the processor to execute the step of waiting until execution of a second message referenced in said meta-data of said message.

55. The computer-readable medium recited in claim 39, wherein the instructions causing the processor to execute the step of receiving to the queue a message include instructions causing the processor to execute the step of receiving to the queue a message comprising a correlation identifier, which describes a message to a user.

56. The computer-readable medium recited in claim 39, wherein the instructions causing the processor to execute the step of receiving to the queue a message include instructions causing the processor to execute the step of receiving to the queue a message comprising a name of a reply message queue in said database system, and wherein the step of executing said message includes the step of enqueuing an execution result of said message in said reply message queue.

57. The computer-readable medium recited in claim 39, wherein the instructions causing the processor to execute the step of receiving to the queue a message include instructions causing the processor to execute the step of receiving to the queue a message comprising a security context of said message.

58. A computer data signal embodied in a carrier wave and representing sequences of instructions which, when executed by a processor, cause said processor to queue messages in a database system by performing the steps of:

establishing a queue in a memory coupled to a processor using a table of said database system in said memory and executed by said processor;

receiving to the queue at least one message comprising message meta-data and message user data, said message meta-data including a condition for executing said message;

waiting until said condition is satisfied;

executing said message by an application program in said memory and executed by said processor; and retaining said message in said queue.

59. A method for receiving, queuing and executing messages in a database system in a computer system including a memory, comprising the steps of:

establishing a queue in the memory using a table of the database system;

receiving to the queue at least one message comprising message meta-data and message user data, said message meta-data including a condition for executing said message;

executing said message by an application program only when said condition is satisfied; and retaining said message in said queue.

60. A computer-readable medium having stored thereon a plurality of sequences of instructions, said plurality of sequences of instructions including sequences of instructions which, when executed by a processor, cause said processor to perform the steps of:

establishing a queue in a memory coupled to a processor using a table of a database system in said memory and executed by said processor;

receiving to the queue at least one message comprising message meta-data and message user data, said message meta-data including a condition for executing said message;

executing said message by an application program in said memory and executed by said processor only when said condition is satisfied; and retaining said message in said queue.

* * * * *